US006917737B2

(12) United States Patent
Uhlenhuth et al.

(10) Patent No.: US 6,917,737 B2
(45) Date of Patent: Jul. 12, 2005

(54) COMMUNICATION CABLE HAVING LOOPS OF A RETAINER ELEMENT AT SUCCESSIVE LOCATIONS, A METHOD AND APPARATUS FOR FORMING THE CABLE

(75) Inventors: Guenther Uhlenhuth, Roedental (DE); Martin Loczenski, Neustadt (DE)

(73) Assignee: CCS Technology, Inc., Wilmington, DE (US)

( * ) Notice: Subject to any disclaimer, the term of this patent is extended or adjusted under 35 U.S.C. 154(b) by 586 days.

(21) Appl. No.: 09/994,112

(22) Filed: Nov. 26, 2001

(65) Prior Publication Data

US 2002/0064351 A1 May 30, 2002

Related U.S. Application Data

(63) Continuation of application No. 08/603,719, filed on Feb. 20, 1996, now Pat. No. 6,438,824.

(30) Foreign Application Priority Data

Feb. 20, 1995 (DE) ........................................ 195 05 757
Dec. 14, 1995 (DE) ........................................ 195 46 773

(51) Int. Cl.[7] .................................................. G02B 6/44
(52) U.S. Cl. ...................................................... 385/104
(58) Field of Search .................................. 385/100–114

(56) References Cited

U.S. PATENT DOCUMENTS

| | | | | |
|---|---|---|---|---|
| 3,154,334 A | | 10/1964 | Rosen | |
| 3,405,443 A | | 10/1968 | Jore et al. | |
| 3,495,025 A | | 2/1970 | Ross | |
| 3,495,835 A | | 2/1970 | Laa | |
| 3,579,823 A | | 5/1971 | Gressitt | |
| 4,885,835 A | | 12/1989 | Osgood | |
| 5,165,003 A | | 11/1992 | Carter | |
| 5,325,457 A | * | 6/1994 | Bottoms et al. | 385/113 |
| 5,414,211 A | | 5/1995 | Chan | |
| 6,085,009 A | * | 7/2000 | Risch et al. | 385/109 |
| 6,438,824 B1 | * | 8/2002 | Uhlenhuth et al. | 29/828 |

FOREIGN PATENT DOCUMENTS

| | | | |
|---|---|---|---|
| DE | 240 619 | 5/1910 | |
| DE | 68023 | 7/1969 | H02G/1/14 |
| DE | 1515893 | 12/1969 | H02B/27/01 |
| DE | 1590930 | 6/1970 | H02B/27/01 |
| DE | 2533640 A1 | 2/1977 | H02G/3/26 |
| DE | 110905 | 9/1977 | D04B/39/00 |
| DE | 132 600 | 5/1982 | |
| DE | 31 13 528 | 5/1983 | |
| DE | 34 21 624 | 12/1985 | |
| DE | 86 13 035.8 | 9/1986 | |
| DE | 256 881 | 5/1988 | |
| SU | 1137596 | 1/1985 | |

OTHER PUBLICATIONS

Ehlers, Walther, *Kabel–Horstellung,* 1956 (pp. 370–371).
Arnold, R. et al., *Kemafil: universelle Ummantelungsteschnologie,* Jul./Aug. 1994 (p. T85).
Arnold, et al., *Production Of Cord And Narrow Fabric Products With Kemafil Technology*, Reprint from *Narrow Fabric and Braiding Industry,* vol. 30, 1993, 4–10, 76–81, 31 (1994) 48–52.

* cited by examiner

*Primary Examiner*—Khiem Nguyen

(57) ABSTRACT

For the longitudinal application of at least one elongated retainer element onto a longitudinally extending bundle having a plurality of electrical and/or optical transmission elements, a retainer element is formed into a loop at successive discrete locations of the bundle and the respective loops are tightened to form a retaining force. Preferably, the loops are chained together by having the loop of the next following loop passing through the preceding loop.

15 Claims, 17 Drawing Sheets

FIG 11
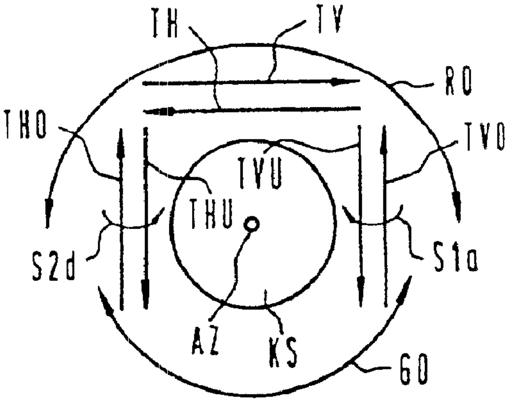
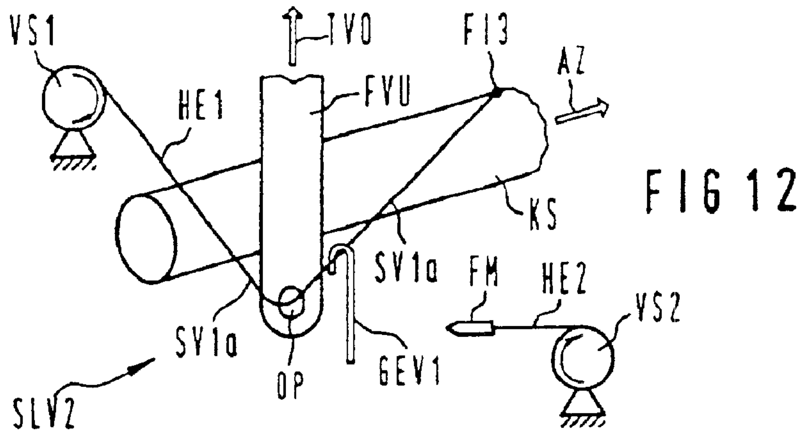
FIG 12
FIG 13
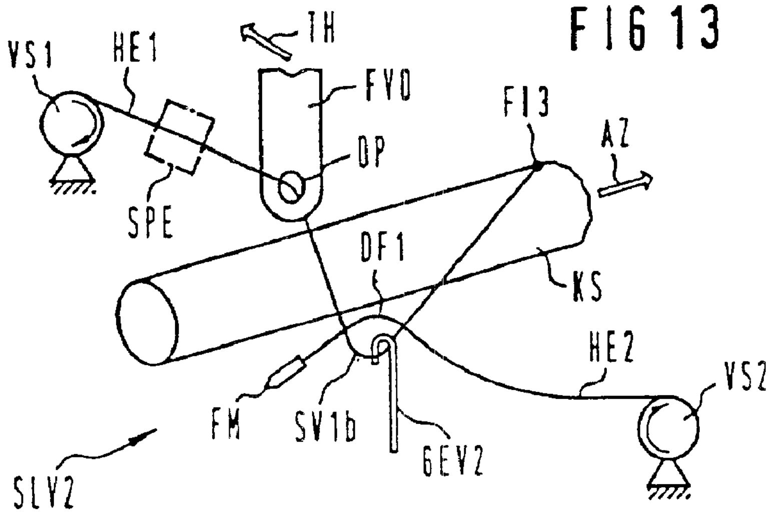

FIG 24
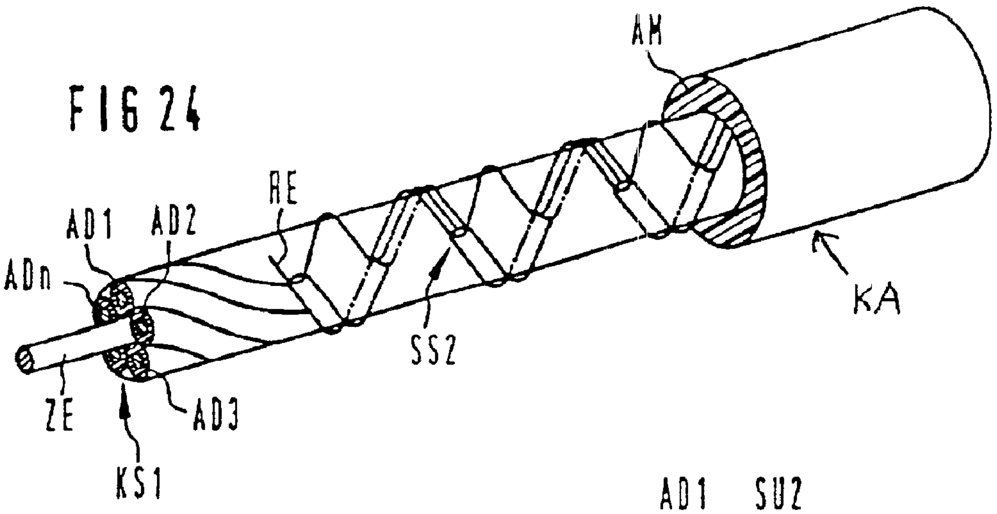
FIG 25
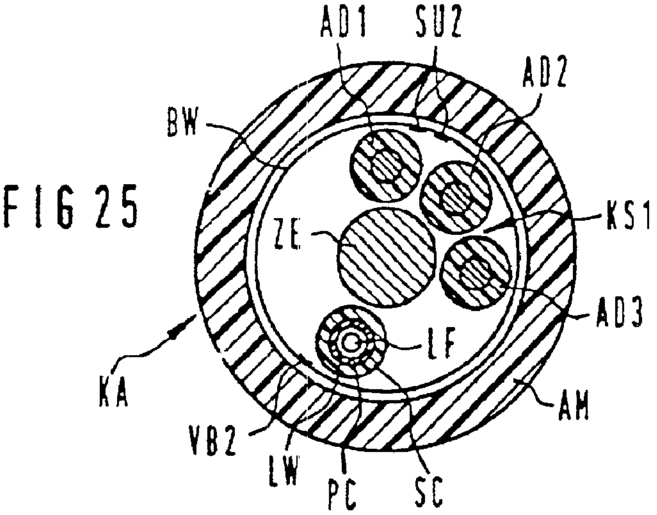
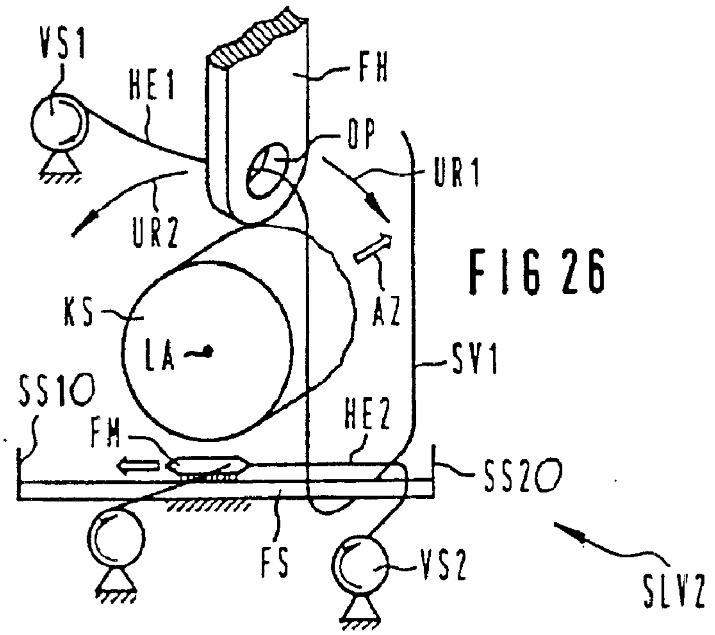
FIG 26

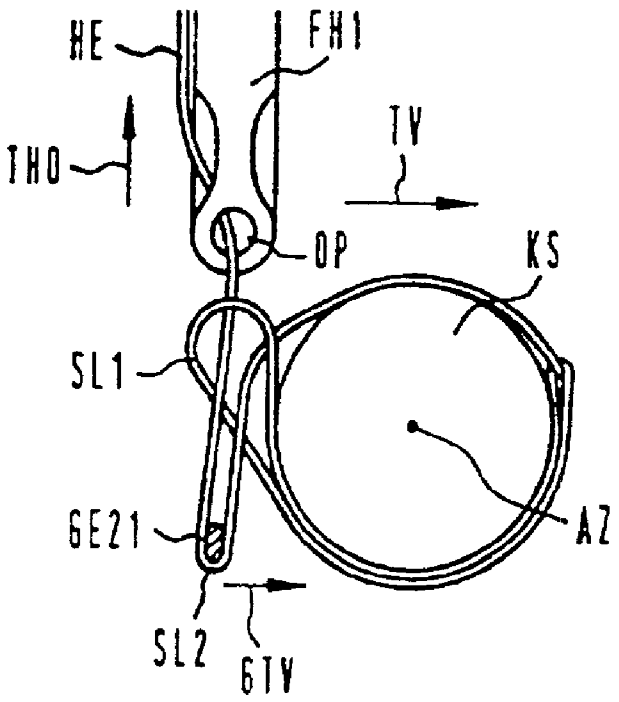
FIG 38
FIG 39
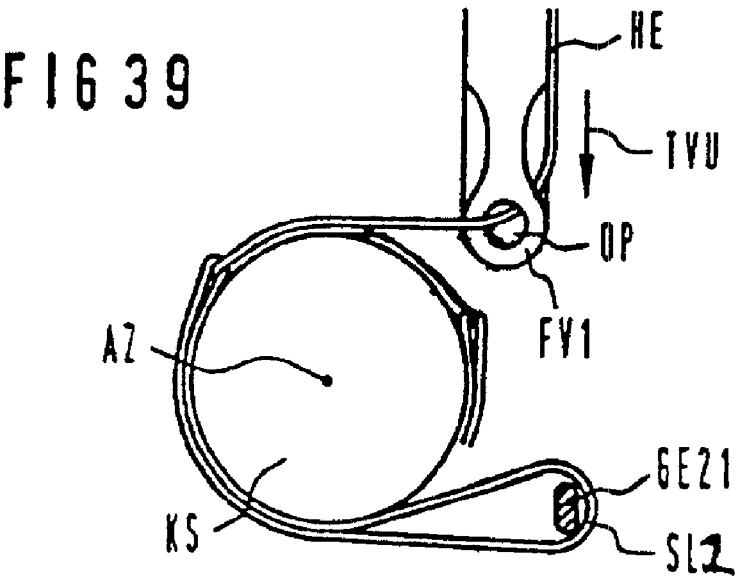

COMMUNICATION CABLE HAVING LOOPS OF A RETAINER ELEMENT AT SUCCESSIVE LOCATIONS, A METHOD AND APPARATUS FOR FORMING THE CABLE

CROSS-REFERENCE TO RELATED APPLICATIONS

This application is a continuation of U.S. application Ser. No. 08/603,719, filed Feb. 20, 1996 now U.S. Pat. No. 6,438,824, which is hereby incorporated herein in its entirety by reference.

BACKGROUND OF THE INVENTION

The present invention is directed to a method for the longitudinal application of an elongated retainer element onto a traversing travelling or moving bundle having a plurality of electrical and/or optical transmission elements.

In cable technology, cable cores are helically wound with a retaining element, especially a retaining helix, in many practical situations in order to hold the cable elements thereof so that, for example, electrical and/or optical leads or conductors together in a unified manner. The winding is preferably undertaken with what is referred to as a tangential or central retaining helix wrapper. These work with supply reels that rotate around the cable core as the core passes therethrough. The structure and manipulation of such a rotating winding device are involved. An example of such a retaining helix spinner is disclosed, for example, in DE 31 135 28.

It is also known from the cable technology for very specific applications so surround cable cores all around with, for example, a weave or a metallic shielding in a closed fashion or to wrap them with a fine mesh. Such applied weaves, however, cover the entire cable core surface tightly or, respectively, over the full surface to provide an all-around surrounding covering. Such all-around coverings can be produced only in an involved way, for example by knitting, bobbin lace work, weaving, etc., and this expenditure for such a process is only justified where specific demands make these unavoidable, for example for achieving a tight shielding of the cable core with regard to the exterior.

SUMMARY OF THE INVENTION

The present invention is directed to an object of providing a method for a retaining element to be longitudinally applied to a traversing or travelling bundle with a plurality of electrical and/or optical transmission elements in an optimally simple way for holding the bundle together. In the method of the species originally mentioned, this object is inventively achieved in that the loop of the respective retaining element is respectively formed at successive, discrete locations of the bundle and in that the respective loops are then cinched or tightened upon formation of the retaining force.

In that a respective loop is formed of the respective retaining element at successive, discrete locations of the bundle, simple guidance of the retaining element during the longitudinal application onto the traversing or travelling bundle is enabled. In particular, the supply reel for the retainer elements can thereby be arranged in a fixed position so that the complicated rotational movement of the supply reel around the bundle is no longer required. Longitudinally applying the respective retainer element with a variety of structures onto the bundle and effectively holding the transmission elements of the bundle together are now enabled.

Complicated motion sequences that are difficult to control as in, for example, a traditional weaving, bobbin lace work, spinning are largely avoided.

The invention is also directed to an apparatus for the longitudinal application of at least one elongated retainer element onto a travelling bundle having a plurality of electrical and/or optical transmission elements, and this apparatus is characterized in that at least one loop-laying device is provided for the formation of a respective loop of the retaining element as successive, discrete locations of the bundle, and that the means for cinching this loop upon formation of a retaining force for the bundle is provided.

The invention is also directed to a method for holding a traversing, stranded product of a plurality of electrical and/or optical transmission elements together with at least one elongated retaining element that is characterized in that the loops for the plurality of retaining elements are continuously formed at different positions of the outside circumference of the stranded product and that these loops are chained with one another.

The invention is also directed to the communication cable having an elongated cable core, whose plurality of electrical and/or optical transmission elements are held together as a bundle by at least one elongated retaining element, said communications cable being characterized in that the respective retaining element forms a respective loop at successive, discrete locations of the bundle and in that the respective loop can be tightened or cinched to form a retaining force on the bundle.

Other advantages and features of the invention will be readily apparent from the following description of the preferred embodiments, the drawings and claims.

BRIEF DESCRIPTION OF THE DRAWINGS

FIG. 11 is a schematic cross sectional view of the chronological motion sequence of the loop laying apparatus for the implementation of the method according to FIGS. 1–7;

FIGS. 12–15 are schematic perspective views showing the chronological sequence of individual steps as well as the elements for the further loop-lying apparatus as a modification of the method according to FIGS. 1–7;

FIG. 24 is a perspective view of an electrical and/or optical communication with the inventive applied retaining element according to FIGS. 1–11;

FIG. 25 is an enlarged cross sectional view of the cable of FIG. 24;

FIG. 26 is a partial perspective view schematically illustrating the elements of the loop-laying apparatus for the implementation of the method illustrated in FIGS. 12–17;

FIGS. 35–41 are diagrammatic cross sectional views of a loop-laying apparatus for the implementation of the method according to the invention of FIGS. 1–11;

DESCRIPTION OF THE PREFERRED EMBODIMENTS

Figure 1:
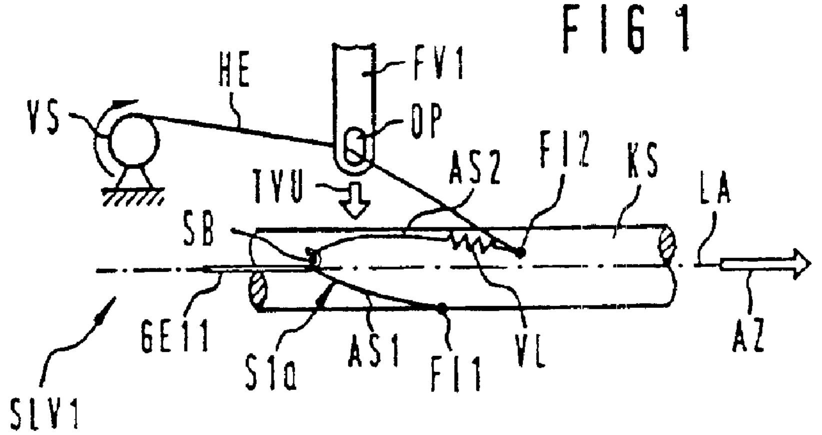
FIGS. 1–7 are a plurality of partial perspective views illustrating the method steps for the implementation of the method of the present invention.

Elements having the same function and action are respectively provided with the same reference characters in FIGS. 1–44.

Figure 27:
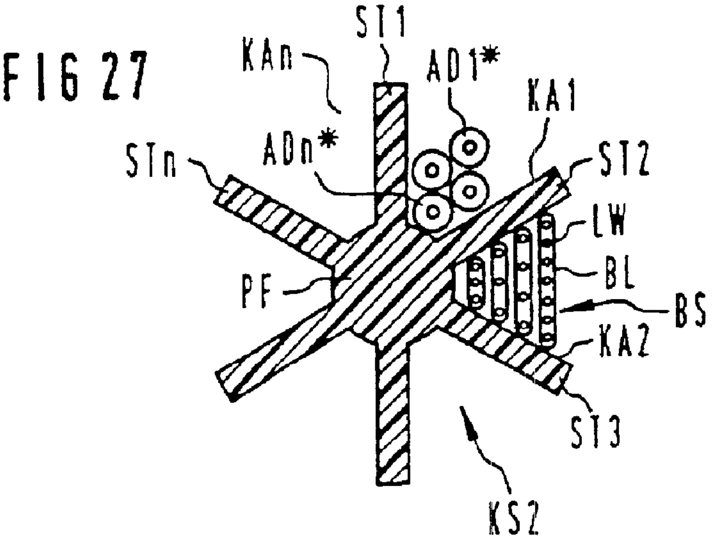
FIG. 27 is a cross sectional view of another type of cable which can utilize the retaining element of the present invention.
Figure 42:
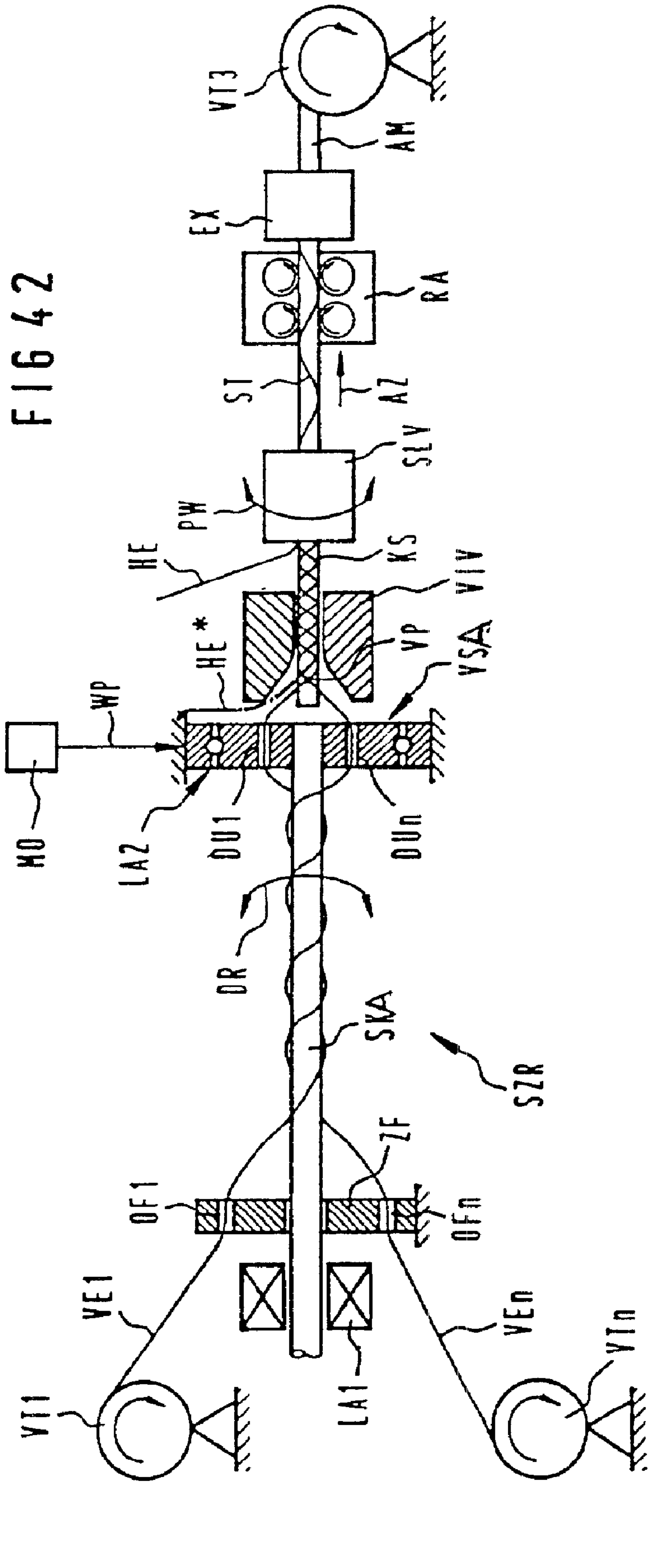
FIG. 42 is a schematic diagrammatic side view of the apparatus according to the present invention for manufacturing an electrical and/or optical cable.

Schematic and partially schematic views of FIGS. 1–7 show the function and action of a first inventive loop-laying apparatus SLV1, with whose assistance an elongated retainer element HE can be inventively longitudinally applied onto a continuously travelling bundle KS, which has a plurality of electrical and/or optical transmission elements, for holding the bundle KS together. For the sake of clarity in the drawings, the elongated bundle KS is illustrated as only a sub-section of a traversing, overall length and is only schematically indicated as an approximately circular-cylindrical element. This stands for numerous structures, shapes of cross sectional geometry, configuration as well as dimensioning of the bundle KS in cable technology. In particular, the cable bundle KS corresponds in terms of structure and function to a cable core of an electrical and/or optical communications cable. In particular, such a cable core comprises an outside diameter between 1 mm and 100 mm, and preferably in a range of 3 mm and 50 mm. Specifically given optical communications cables, the outside cable core diameter lies below about 20 mm. The bundle KS is preferably continuously manufactured over an extremely long cable length. The bundle KS preferably extends along an overall length of between 0.5 km and 25 km, and preferably between 1 km and 10 km. The bundle KS can be formed, for example, by a plurality of electrical and/or optical transmission elements lying loosely next to one another. Expediently, the electrical and/or optical transmission elements can also be stranded with equal lay or SZ-stranded to form a bundle, such as illustrated in FIGS. 24, 25 and 42. As warranted, one or more additional cable elements, such as, for example, a tensile reinforcing element or a central tensile element can be accommodated in the bundle. Preferably, the transmission elements can be stranded around the central tensile element to form an elongated bundle. It can also be expedient to accommodate one or more electrical and/or optical transmission elements in respective chambers of an elongated chamber or profiled elements, for example an elongated bundle can also be formed by a profiled element equipped with transmission elements, such as illustrated in FIG. 27.

What is preferably understood within the scope of the invention by the term "electrical and/or optical transmission element" is an elongated conductor train for power and/or message transmission having different structures, configurations, cross sectional shapes, dimensions, etc. An electrical transmission element, for example, can be formed by an insulated, electrically conductive metal conductor, such as an electrical lead, and by electrical ribbon conductors, an electrical cable core having a plurality of electrical leads, as well as other configurations with electrical conductors. Within the scope of the invention, an optical transmission element preferably represents a light waveguide, a hollow light waveguide lead or lead bundle, a light waveguide ribbon, a light waveguide ribbon stack as well as other structures having at least one optical fiber.

Threads, twines, bands, filaments, electrical and/or optical transmission elements as well as other winding or wrapping elements preferably employed in cable technology are especially suitable as the retaining element HE. In particular, the bundle KS is surrounded, preferably helically wound, in a longitudinal direction with a retaining element of Kevlar, poly yarn or fiberglass.

For combining the individual elements of the bundle or cable KS and holding them together, the retaining element HE, for example, is applied all around the bundle KS along the longitudinal extent thereof in the chronological sequence of the following method steps. In FIGS. 1–7, the bundle KS is continuously conveyed forward from left to right along a longitudinal axis LA of the bundle, which axis is shown in a dot-dashed line. Preferably, this an approximately straight line, and this is respectively illustrated by an arrow AZ.

In FIG. 1, the elongated retaining element HE is hauled off from a stationary, locally fixed supply reel VS. The element HE is conducted through a passage or eyelet OP of a guide means FV1 in the direction onto the continuously moving bundle KS. The guide means FV1 is, thus, advantageously attached fixed in a longitudinal position with respect to the guide means position in the longitudinal direction, i.e., the guide means FV1 maintains a spatial, absolute longitudinal position relative to the moving bundle KS. For example, the guide means FV1 can be fashioned as an elongated rod extending approximately on a straight line, whose one side preferably comprises an approximately circular eyelet for the guidance of the retaining element HE. In FIG. 1, the guide means FV1 is arranged, for example, at a topical position above the bundle KS. Viewed spatially, it lies in front of the bundle, i.e., on the right side of the bundle KS as viewed in the throughput direction or, respectively, haul-off direction AZ. The guide means extends essentially transversely, particularly approximately perpendicularly to the longitudinal axis LA of the bundle KS. In the plane of the drawing of FIG. 1, the guide means FV1 particularly comprises an essentially vertical longitudinal extent.

Coming from the guide means FV1, the retainer element HE is laid to form a first loop or, respectively, lap S1*a* along a prescribed initial length section. For greater clarity, this loop S1*a* is hinged out of its actual attitudinal plane by about 90° in the plane of the drawing of FIG. 1, and is only schematically shown for the sake of simplicity. The loop S1*a* is formed with a prescribable initial length of the retainer element HE in that, for example, an end at the start of the retainer element HE is mechanically fixed to the outside circumference of the bundle KS at a first location Fl1, as well as at a second location Fl2, after traversing a prescribable loop length section. In the illustration of FIG. 1, both fixing locations FI1 and FI2 lie following the longitudinal locus position of the guide means FV1 as viewed in a haul-off direction AZ, for example to the right of the guide means FV1. For example, the fixing location FI1 is entered in the region of the lower edge or side of the bundle KS in FIG. 1, for example at the underside of the bundle KS shown in perspective. The fixing location Fl2, for example, lies farther downstream from the fixing location FI1 in FIG. 1 as viewed in the longitudinal direction, for example at a distance following the fixing position FI1 at a circumferential position different from that of the fixing location Fl1. In FIG. 1, the fixing location FI2 is shown in the upper half, for example at an upper side or surface of the bundle KS. The loop or length section S1*a* between the two fixing locations FI1 and FI2, thus, represents a bellying of the retainer element HE with respect to the original guide path thereof coming from the guide means FV1 to the fixing location FI2 at the outside circumference of the bundle KS. The loop laying is preferably effected in that the retainer element HE runs back opposite the haul-off direction AZ over a sub-length AS2+VL as viewed in the longitudinal direction proceeding from the fixing location Fl2, then reverses its direction in the apex region SB and, in turn, approaches a fixing location FI1 in the haul-off direction AZ over a partial length segment AS1 along the longitudinal extent of the bundle KS. The retainer element HE, thus, initially lies loosely, for example untensed, between the two fixing locations FI1 and Fl2. For the sake of simplicity, this condition of the loop is schematically indicated in FIG. 1 with helical turns of a reserve length section VL.

In FIG. 1, the loop S1*a* is aligned and held stationary with the assistance of gripper elements GE11. In FIG. 1, the gripper element GE11 is fashioned as a hook-shaped element and is hooked into the loop S1*a* in the region of its apex SB, for example the closed end of the loop. The loop S1*a* is preferably oriented so that, with the assistance of the gripper element the closed end or apex SB of the loop is opposite the haul-off direction AZ and extends toward the left to such an extent opposite the haul-off direction that the guide means FV1 can be moved downward through the loop S1*a*. In particular, the gripper element GE11 is arranged longitudinally fixed in position with respect to its spatial, absolute position. With its assistance, the loop S1*a* of FIG. 1 is held open so that, for example, the loop S1*a* is placed approximately into the shape of a parabola. Gripping and holding the loop S1*a* open is expediently undertaken with the assistance of the gripper element GE11 so that the loop extends essentially in the longitudinal direction of the bundle KS, whereby the closed end or apex region SB lies in front of the open end between the fixing locations Fl1 and Fl2, as viewed in the longitudinal or, respectively, haul-off direction AZ. The loop S1*a* of FIG. 1 is thus composed of a first parabola branch AS1 between the gripper element GE11 and the fixing location Fl1, as well as a second parabola branch AS2+VL between the gripper element GE11 and the fixing location Fl2.

The fixing of the first loop S1*a* at the outside surface of the bundle KS can be expediently undertaken with the assistance of an adhesive at the fixing locations Fl1 and Fl2. It can be just as expedient to secure the two ends of the parabola branches AS1 and AS2 to the bundle KS with, for example, the assistance of an adhesive or retainer tape. To that end, such a fixing tape is locally limited all around the bundle KS in the region of the ends of the parabola branches AS1 and AS2, for example, it is only wound onto a short length section.

Expediently, the laying and fastening of the first loop to the bundle KS is manually implemented by an operator while the supply reel VS, the guide means FV1, the gripper element GE11, as well as the bundle KS itself stands still.

It can also be potentially expedient to lay the first loop with a different geometrical shape as well as a different position for the fixing location as well as a respective loop or lap having an adequately large passage for the looping of the guide means FV1 therethrough is offered. For example, the loop S1*a* can also be designed and held open with a semicircular or triangular course or shape. Expediently, all following loops are then also laid with approximately the same geometrical shape.

Figure 2:
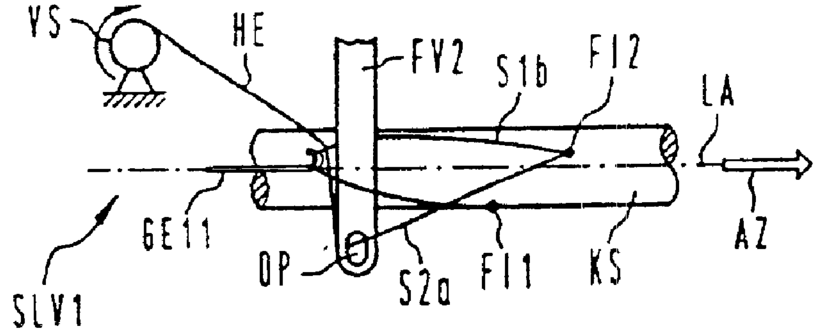

Since the bundle KS is continuously conveyed forward in the haul-off direction AZ, the retainer element HE on the path from the supply reel VS to the fixing location Fl2 is under tension. At the same time, the first-placed loop enlarges or, respectively, stretches in the longitudinal direction, since it is entrained by the traversing bundle KS but is held fast opposite the haul-off direction by the gripper element GE11 for example, the first loop S1*a* is continuously under tension or, respectively, tightened during the haul-off motion AZ of the bundle and is thereby cinched. Simultaneously, the guide means FV1 is moved downward from its position above the bundle KS toward the loop S1*a* in order to form a new, second loop. The downward motion of the guide means FV1 is identified with an arrow TVU in FIG. 1. While the first loop S1*a* is held open with the assistance of the gripper element GE11, the guide means FV1 together with the retainer element HE that continues to be continuously hauled off from the supply reel VS is passed through or, respectively, pulled through the first loop S1*a*. This condition is shown in FIG. 2, whereby the new topical position of the guide means is referenced FV2. The lengthened or tightly-drawn first loop is identified by the character S1*b* in FIG. 2.

In that a new sub-section of the total length of the retainer element HE is pressed downward, for example conducted through the first loop S1*b* between the supply reel or a supply drum VS and the fixing location Fl2, a second, new loop S2*a* with side branches approximately corresponding to the side branches of a triangle is being formed. This second loop S2*a* has the extension of its right-hand loop branch, as viewed in the haul-off direction AZ, continuously connected to the first loop S1*b* at the fixing location Fl2. The other end, i.e., the left-hand loop branch, merges into the remaining length of the retainer element HE being continuously hauled off from the supply reel VS.

Figure 3:
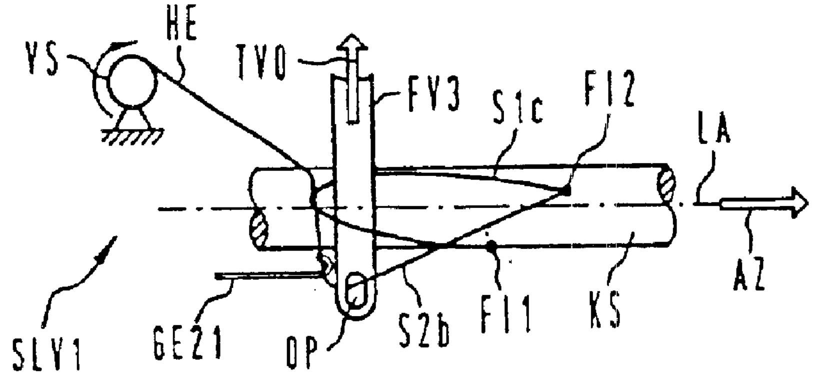

The guide means FV2 preferably projects to such an extent into the first loop S1*b* that the second loop S2*a* is seized by a gripper element GE21 below the spatial position of the first loop S1*b* and can be held longitudinally fast in position with respect to this absolute longitudinal position while the bundle KS continues to be continuously conveyed forward, as illustrated in FIG. 3. Thus, the increasingly cinched course of the first loop newly occurring due to the haul-off motion of the bundle KS is referenced S1*c* and that of the second loop is references S2*b*. As soon as the second loop S2*b* has been conducted through the first loop S1*c* with the assistance of the guide means FV2, the gripper elements GE11 can be released from the loop S1*b* and withdrawn. The guide means FV2 penetrates the opening of the first loop S1*b* and, thus, holds it open for the second loop S2*a* to be looped therethrough. The gripper element GE11 can, therefore, be disengaged or unhooked from the first loop S1*b*. In FIG. 3, the gripper element GE11 allocated to the first loop has been omitted. Expediently, the gripper element GE21 is fashioned to correspond to the gripper element GE11. While the gripper element GE21 holds the newly-formed second loop S2*b* of FIG. 3 open, the guide means is, in turn, withdrawn and moved back from the lower position FV2 upward in the arrow direction TVO into its initial position shown in FIG. 1. This upward motion of the guide means is identified by the reference character FV3.

Figure 4:
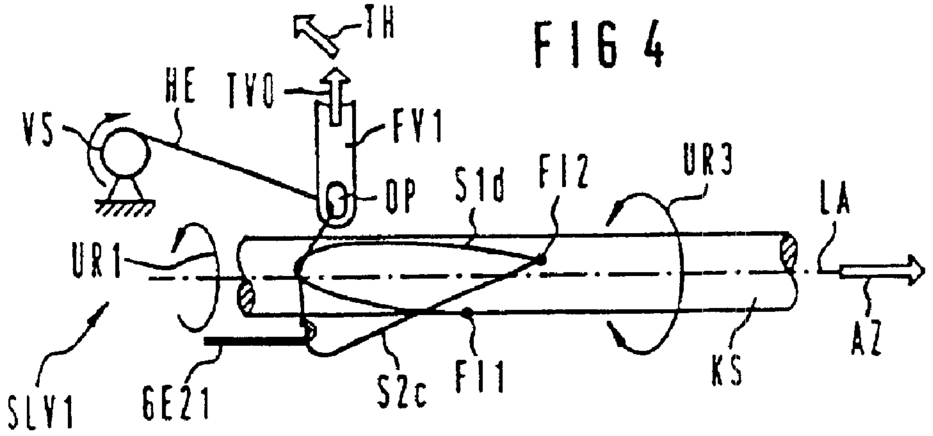

FIG. 4 shows the condition of the first and second loop following the upward movement of the guide means into its original starting position FV1. The new loop course for the first as well as the second loop again occur since both loops are conveyed farther in the haul-off direction AZ by the bundle KS, but are held back by the gripper element GE21 and are, thus, respectively, cinched or tightened. The newly-occurring loop courses are referenced S1*d* for the first loop and S2*c* for the second loop. Despite the upward motion of the guide means, the second loop S2*c* penetrates the first loop S1*d* farther, and the second loop S2*c* still remains below the first loop S1*d*. The second loop S2*c*, namely, is held with respect to its position in a longitudinal direction by the gripper element GE21 during the upward movement of the guide means so that the second loop S2*c* cannot be undone or be pulled away in an upward direction. On the contrary, the retaining element HE continues to be hauled off from the supply reel VS by the upward motion of the guide means as well as the haul-off motion of the two loops in the longitudinal direction as the bundle KS continues to move in the direction of arrow AZ. The downward as well as upward motion of the guide means according to FIGS. 1–4, thus, occurs corresponding to the sequence of the topical positions FV1, FV2, FV3 and back to FV1. The downward as well as upward stroke of the guide means is thereby preferably undertaken faster than the speed with which the bundle KS is conveyed forward in the haul-off direction AZ. Especially assured in this way is that, given continuation of the loop-laying process, a respectively new loop is produced at the same longitudinal place and can be inserted through the loop that has, respectively, produced temporally earlier and is now held open and continues to be conveyed in the haul-off direction AZ.

As illustrated in FIG. 4, the gripper element GE21 is moved in a counter-clockwise direction (see arrow UR1) around the axis of the cable or bundle KS when viewed in the haul-off direction to the other side, i.e., the back side of the bundle KS during the continued forward movement. To that end, the gripper element GE21 preferably moves over the top of the bundle KS into a circumferential position that lies opposite that of FIG. 4 and offset by 180°. As a result of this change in position, the second loop S2*c* is placed over the bundle KS from front to back. Due to the change in circumferential position, the gripper element GE21 pulls the second loop S2*c* through the first loop S1*d* from the front side onto the back side of the bundle KS. Since the first loop S1*d* together with the bundle KS continues to move forward in the haul-off direction AZ during the change in sides of the second loop S2*c*, the second loop S2*c* clinging to the surface of the bundle is also cinched and tightened with a privileged direction in the longitudinal direction. Due to the combination of the longitudinal movement of the two loops S1*d* and S2*c* of FIG. 4, as well as the partial rotational movement of the second loop S2*c* with the assistance of the gripper element GE21, the two loops S1*d* and S2*c* coupled to one another are pulled across the bundle KS along a partial segment of a helix. In other words, they are being wrapped around the bundle in a helical path.

Figure 5:
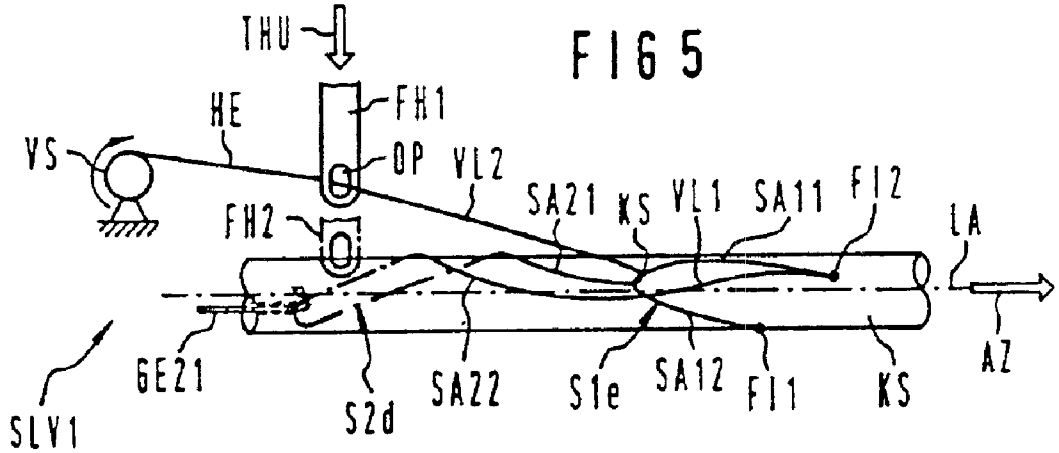

This new loop-laying condition is schematically shown in FIG. 5, wherein the first loop is now referenced S1*e* and the second loop is referenced S2*d*. The part of the second loop S2*d* that comes to lie on the back side of the bundle KS is indicated in dot-dashed lines in FIG. 5. The gripper element GE21 is likewise shown dot-dashed, since it now assumes a position on the back side of the bundle KS. The coupling of the two loops S1*e* and S2*d* to one another is achieved in that the extension of the branch or, respectively, arm of the second loop S2*d* changes to that branch of the first loop S1*e* lying opposite as viewed in the longitudinal direction and clings thereon. In FIG. 5, the first loop S1*e* has a loop branch SA11 that is at the left as viewed in the haul-off direction AZ and is connected to a right-hand loop branch SA22 on the second loop by a connection length VL1. An extension of the right-hand loop branch SA22 of the second loop S2*d* thus crosses the apex region of the first loop S1*e*, when viewed in running direction, and changes to what is the left-hand loop branch SA11 of the first loop S1*e* that lies opposite as viewed in the running direction. Thus, the loop branch SA21 of the second loop S2*d* lies at the right side when viewed opposite the haul-off direction AZ, wraps around the apex region of the first loop S1*e* and thereby effects the coupling for a following, third loop to be newly formed. As a result thereof, the second loop S2*d* is held at the same longitudinal position in the locus space as the first loop as been previously held in FIG. 1 by the gripping element GE21 and, at the same time, the first loop S1*e*, as well as the second loop S2*d* clinging thereon, are moved forward in the haul-off direction AZ with the bundle KS. The first loop S1*e*, as well as the second loop S2*d* attached thereto, is cinched. As a result thereof, the respective side branches essentially proceed parallel next to one another in the taut condition after being tightened. In particular, the two loops S1*e* and S2*d* proceed behind one another with the same orientation of the pitch of an imaginary helix as viewed opposite the haul-off direction AZ and they preferably leave about the same laid shape or loop shape. The second loop S2*d* is thereby attached or, respectively, appended to the first loop S1*e* opposite the haul-off direction, i.e., toward the left in FIG. 5. In FIG. 5, thus, the first loop S1*e* is allocated to a first discrete position at the outside circumference of the longitudinal bundle KS and the second loop S2*d* clinging to the first loop S1*e* is allocated to a second discrete location, i.e., a prescribable sub-length section, at the outside circumference of the bundle KS.

In order to attach another new, third loop to the second loop S2*d* opposite the haul-off direction AZ, the guide means for the retaining element HE is brought, in the meantime, from its position FV1 on the front side of the bundle to a back side thereof, and this movement is indicated in FIG. 4 by an arrow TH that points to the back side of the bundle KS. The movement of the guide means onto the back side of the bundle KS is, therefore, implemented about an isochronically or synchronously with the second loop S2*c* being pulled through the first loop S1*d* of FIG. 4. In this way, the guide means is available for the retainer element HE after the laying of the second loop S2*d* of FIG. 5 in a position above the bundle KS as well as at the long side of the bundle KS lying opposite the position FV1. The topical position of the guide means in this loop-laying condition is, thus, indicated at FH1 in FIG. 5.

Figure 6:
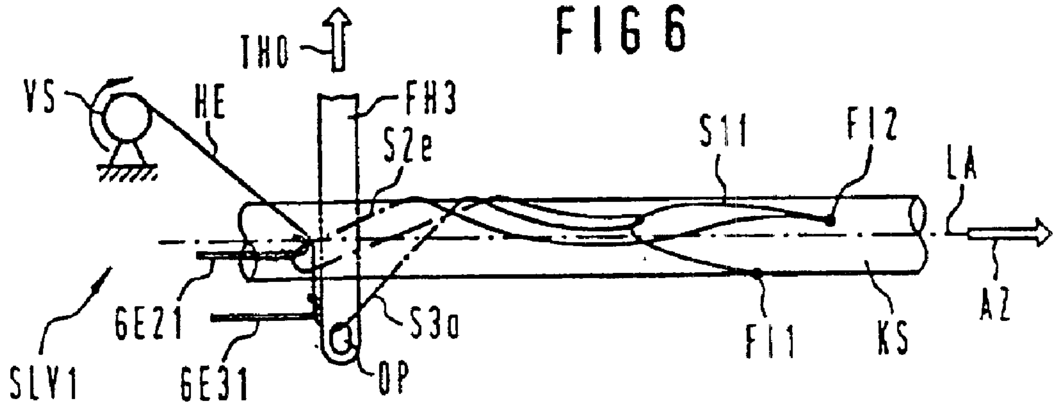

In FIG. 6, the first loop is referenced S1*f* and the second loop is referenced S2*e*. For threading a new, third loop through the second loop S2*e*, the guide means is moved downward through the second loop S2*e* analogous to the passing of the second loop through the first loop according to the method steps illustrated in FIGS. 1 and 2. The downward movement of the guide means is identified with the arrow THU in FIG. 5. The position of the guide means during this downward movement is referenced FH2. The guide means thus passes the retainer element HE which is assuming an approximately triangular shape through the second loop S2*e* which is held open with the assistance of the gripper element GE21 and, as a result, a third loop S3*a* is formed. A gripper element GE31 on the back side of the bundle KS intervenes into the third loop S3*a* so that the third loop S3*a* that is formed can be held during the following upward movement or return stroke of the guide means. In turns of function and action, the gripper element GE31 is fashioned like that of the gripper GE21. In FIG. 6, the upward movement of the guide means is identified with the arrow THO and the guide means is identified by the reference FH3. As soon as the newly-formed, third loop S3*a* is seized by the gripper element GE31, the second gripper element GE22 for the second loop S2*e* can be loosened and removed. The seizing of the newly-formed third loop S3*a* can also preferably occur in that the gripper element GE21 is unhooked from the second loop S2*e* of FIG. 6 and is hooked into the third loop S3*a* as soon as the guide means has been passed through the second loop S2*e*.

As viewed in the haul-off direction AZ, the gripper element GE31 migrates or moves with the third loop S3*a* clinging thereto downward and around about 180° in a circumferential direction around the bundle to the front side of the bundle. As a result of the simultaneous forward motion of the bundle KS with the loops S1*f*, S2*e*, as well as S3*a*, clinging thereto, a third loop is pulled from the back side of the bundle KS onto the front side thereof and stretched to the position shown in FIG. 7. A coupling or, respectively, chaining of the three loops S1*f*, S2*e* and S3*a* occurs, and they form a sub-section of a helix by following one another. The three loops S1*f*, S2*e* and S3*a* following one another as viewed opposite the haul-off direction thereby lie at three successive discrete locations or sub-sections of this helical line.

In a further continuation of the inventive method, the guide means is then, in turn, moved back from its position FH3 on the back side of the bundle KS as shown in FIG. 6 into its initial position FV1 of FIG. 1 and a new cycle is begun. The change from the back side to the front side of the bundle KS is illustrated with an arrow TV in FIG. 7. Loops are then subsequently attached to the third loop S3*b* in the same way as the second and third loops, for example analogous to the steps according to FIGS. 1–6, so that with the initial loop S1*a* therefore remaining out of consideration. Respectively two loops coupled to one another, such as, for example, S2*f* and S3*b* of FIG. 7, form a period of the resultant helical line in the lapping or winding of the bundle KS with the loops of the retainer element HE. To that end, the loop length as well as the laying pitch are expediently selected so that for each respective loop, the respective loop reaches about half-way around the outside circumference of the bundle KS. The continuous chaining of these essentially identical loops S2*f* as well as S3*b* following one another thereby occurs approximately along a lead of the helical lapping.

Figure 7:
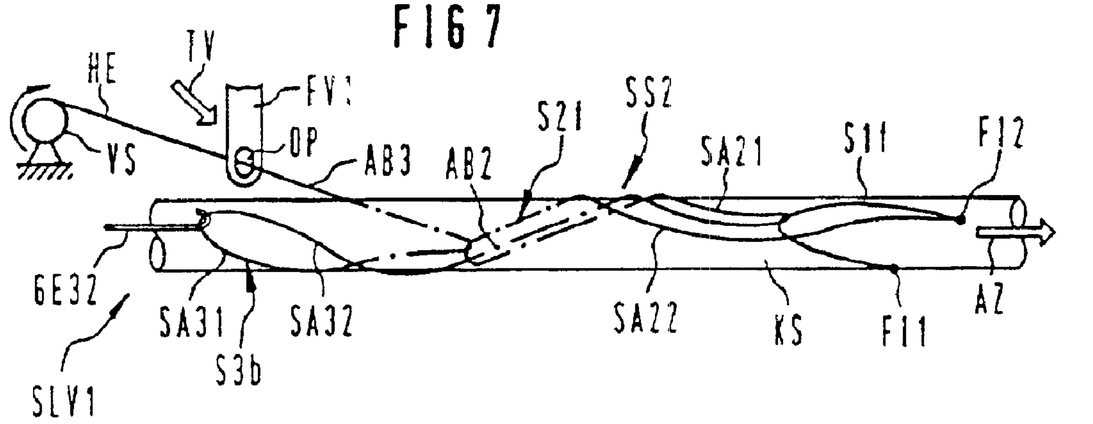

In FIG. 7, the bundle KS is thus surrounded with a loop structure generally indicated at SS2 according to the following principle, with the initial loop S1*f* being left out of consideration.

A first loop S2*f* is respectively placed around the bundle KS on a length sub-section of a spiral, for example a helical spiral or helix. This loop S2*f* comprises two loop branches SA21 and SA22, wherein the extension of the one forms a tie length section AB2 for the chronologically following second loop that is formed next. In the cinched condition of the first loop S2*f*, the tie length section AB2 proceeds essentially parallel to the loop branches SA21 and SA22 thereof on the same helical length section on the outside surface of the bundle KS, so that a three-element retainer structure having three sub-elements, particularly threads, SA21, SA22 and AB2 are present. The tie length section AB2 of the first loop S2*f* merges into a loop branch SA32 of the two loop branches SA31 and SA32 of the following, second loop S3*b*. This bipartite, second loop S3*b*, thus, forms the continuation of the helical length section of the first loop S2*f*. The two loops preferably, respectively, extend over such a length that combined or coupled to one another, they respectively yield a 360° helicization or period of a helical line around the longitudinal extent of the bundle KS. The tying of the second loop S3*b* to the first loop S2*f* is completed in that the side branch SA31 of the second loop wraps the first loop in the region of the apex thereof. The extension of the side branch forms a tie length section AB3 for the loop that is to be attached next. The tie length section AB3 is thus conducted around the outside circumference of the bundle directly opposite to the rotational sense of the helix of the two loop branches of the second loop S3*b*.

The tie length section AB3 thus runs on a sub-section of the spiral helix that winds around the longitudinal extent of the bundle KS in a direction opposite to the helical line of the two loops S2*f* and S3*b*. Observed opposite the haul-off direction AZ, the helical line allocated to the two loops S2*f* and S3*b* coupled to one another proceed in the fashion of a clockwise right-hand thread, whereas the tie length section AB3 represents a sub-section of a counter-clockwise left-hand thread having approximately the same pitch. As illustrated in FIG. 7, the tie length section AB3 is brought from the back side of the bundle KS over an upper side or half of the bundle lying opposite to the loop S3*b* to the front side of the bundle with the assistance of the guide means FV1 for this purpose. Since the tie length section AB3 serves for the formation of an additional new loop analogous to the loop S2*f*, it is inserted through the second, bipartite loop S3*b*. A discrete sling or noose through which the bundle KS is passed is formed overall in this way by the bipartite loop S3*b* on one side of the bundle KS and by the single element tie length section AB3 along the other side of the bundle. This sling represents a union or composite structure all around the outside circumference of the bundle KS that cannot be undone. Since it can be radially cinched, a radial retaining force for holding the individual elements of the bundle KS can be generated with this arrangement. In such a sling, for example, the tie length section AB3 preferably runs on the upper side of the bundle as a single-element top thread and the loops S3*f* run on the underside of the bundle as a two-element bottom thread. This occurs, for example, given the method sequence according to FIGS. 1–7.

Continuing this type of loop formation, the second loop S3*b* is again followed opposite the haul-off direction AZ by a third loop analogous to the first loop S2*f* as well as by a sling composed of a two-element loop on the underside of the bundle as well as a single-element tie length section or tie branch on the upper side of the bundle analogous to the sling formed by the loop S3*b* and the thread AB3. A plurality of such loop pairs coupled following one another then yield an overall loop structure SS2 of the retainer element as shown in perspective in FIG. 24.

Figure 29:
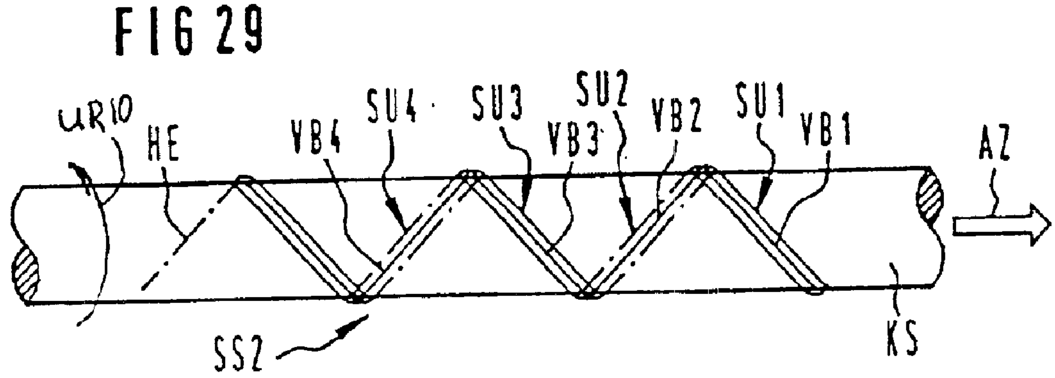
FIG. 29 is a schematic top plan view of a bundle that has been enveloped with a retaining element according to the method of FIGS. 1–7.

FIG. 29 shows the loops structure SS2 in a schematic plan view along a length sub-section of the bundle KS. The length section of the retainer element HE running on the upper side of the bundle is respectively entered lines and length sections of the retainer element HE running on the underside are respectively shown in dot-dashed fashion. Viewed overall, the upper side and underside together in the common laying plane, the loop structure forms a sawtooth-like or triangular zig-zag course. In detail, the loop structure SS2 of FIG. 29 is composed of the following loop part viewed opposite the haul-off direction AZ. From the right to the left in FIG. 29, a loop SU1 proceeds on the upper side in three-element fashion corresponding to S2*f* of FIG. 7 from the lower edge of the bundle KS obliquely toward the upper left on an essentially straight line to the upper edge thereof. The two loop branches as well as the tie branch VB1 to the next loop SU2 lie approximately parallel next to one another so that a three-thread retainer skein essentially occurs overall. Viewed spatially, the three-element loop SU1 extends around about half the outside circumference of the bundle KS and forms a half-wave of a helical line. Its continuation may be found in the two-element loop SU2 corresponding to the loop S3*b* of FIG. 7, which passes on the underside of the bundle KS, and was stretched through the three-element loop SU1. The tie length section of the preceding loop SU1 thereby merges into a side branch of the following loop SU2. In the plan view of FIG. 29, the loop SU2 has its loop branches taut about parallel to one another proceeding obliquely toward the bottom left on an essentially straight line from the end of the loop SU1 at the upper edge, of the bundle KS to a lower edge thereof. A tie length section VB2 is entrained around the top parallel to the two branches or threads of the loop SU2 that run around the bundle KS at the bottom. This tie length section or coupling section VB2 represents an extension of the loop branches of the loop SU2 that does not form a direct continuation of the one side branch of the preceding loop SU1, but produces the coupling to the following third loop SU3. The coupling section VB2 thereby wraps the preceding loop SU1 in the region of the closed end thereof and is conducted through the area bounded by the loop SU2 in the region of the loop apex thereof, i.e., the closed end. As a result thereof, a sling of the retainer element HE is formed that can be cinched with respect to the longitudinal axis of the bundle KS and thereby ties the individual elements of the bundle locally together on all sides in an especially reliable way. Such a sling by itself thus already constricts the bundle KS all around.

In the plan view of FIG. 29, two such loops SU1 and SU2 sequentially attach to one another as well as their tie length sections VB 1 and VB2 thus yield, for instance, the sides of an equilateral triangle with the lower edge of the bundle KS as a hypothenuse. An identical loop pair SU3 and SU4 are appended to the loop pair in an analogous way via the tie length section VB2 of the second loop SU2. The loop SU3 proceeds on the upper side of the bundle KS and is chained with the loop SU4 by a tie length section VB3, analogous to the tie length VB1. As a result thereof, a type of three-element loop SU3 is formed that comprises two loop branches as well as a tie thread VB3 conducted parallel thereto on the upper side. The loop SU4 again proceeds on the under or back side of the bundle KS with its two loop branches. The one side branch of the loop SU4 penetrating the inside of the loop SU3 and its extension proceeds on the front side of the bundle as a tie length section VB4 approximately parallel to the two-element loop SU4 on the back or underside. This tie length section VB4 is returned to the closed end of the loop SU4, penetrates the inside thereof in the region of its closed, left end, and its extension merges into a side branch of the next, following loop.

In that a plurality of such loop pairs like SU1/SU2, SU3/SU4 are coupled to one another continuously as well as interconnected, the loop structure SS2 wherein each second loop is fashioned to form a sling ultimately occurs.

Figure 30:
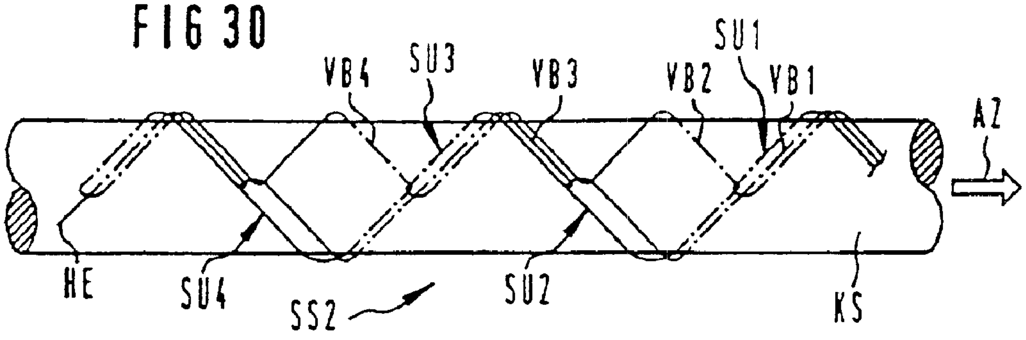
FIG. 30 is a side elevational view of the bundle of FIG. 29 which has been rotated approximately 90° around the axis of the bundle.

FIG. 30 illustrates a loop structure of FIG. 29 with the bundle KS being rotated approximately 90° in a counter-clockwise direction (see arrow UR10) when looking in the direction of the arrow AZ. Viewed in the longitudinal direction, the three-element loop, such as, for example, SU1 at the upper side as well as a two-element loop, such as, for example, SU2 on the under or bottom side, with allocated top threads VB2 follow one another in alternation or cyclically. Whereas the three-element loop, such as, for example, SU1 lies only against a length sub-section of the outside surface of the bundle KS, the two-element loop, such as, for example, SU2 with its appertaining tie length VB2 forms a sling around the entire outside circumference of the bundle KS. As a result thereof, both a tightening of the three-thread loop SU1 as well as a cinching or constriction of the sling SU2/V82 are enabled to form a retaining force for the bundle KS that takes a radial effect. With reference, for example, to the loop pairs SU1 and SU2, how a local sling is respectively generated for the bundle clearly proceeds from the illustration in FIG. 30. As illustrated in FIG. 30, the right-hand side branch SU2 has its extension VB2 looped through the closed end of the loop SU1 on the back side of the bundle KS. Corresponding to the course of the bipartite loop SU2 leading from the bundle KS around the bottom thereof, the tie length section VB2 is conducted over the upper side of the bundle to the front side and pulled thereagainst through the closed end of the loop SU2.

This type of loop structure SS2 can preferably be produced in that, for example, only a single gripper element, such as GE32 of FIG. 7, continuously rotates around the outside circumference of the bundle KS. The gripper element, thus, seizes a loop allocated in alternation along one side of the bundle KS, pulls this to the opposite side and holds it open until a new loop is looped therethrough. Then, the new loop is grasped and carried back to the other side as the gripper continues its rotation around the axis of the bundle. To that end, the guide means for the loop is allocated in alternation according to the method steps of FIGS. 1–7 and corresponds to its positions FH1, FH2 and FH3, for example, on one side and then to its positions FH1, FH2 and FH3 on the opposite side. After formation of a loop, the guide means changes its location with respect to the longitudinal axis of the bundle KS at one of the long sides of the bundle to the respective opposite side.

Given alternating laying of two successive loops, the gripper element, such as GE11, preferably rotates around the bundle KS So fast that the gripper element can be hooked onto the respectively newly-formed loop at a circumferential position respectively offset by 180°.

Figure 8:
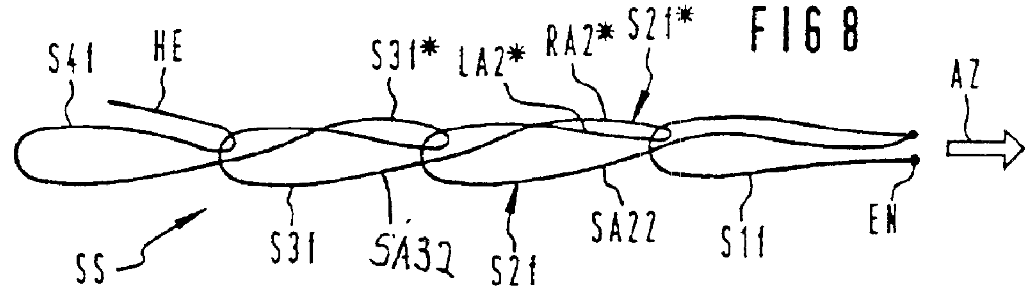
FIG. 8 is a schematic illustration in a common laying plane of a loop chain of the retaining elements formed with the inventive method of FIGS. 1–7.

FIG. 8 schematically shows the formation and chaining of a plurality of loops, which are formed according to the method of FIGS. 1–7 and shown in FIGS. 24, 29 and 30, in a single positional plane for the sake of simplicity, i.e., in an imaginary, common laying plane. For example, a plurality of loops, four loops S1*f*, S2*f*, S3*f* as well as S4*f* (for the sake of clarity) are arranged along an imaginary straight line to form a loop chain SS and are coupled to one another. The four loops S1*f*, S2*f*, S3*f* and S4*f* are thereby arranged identically oriented. For the sake of clarity in the drawings, the loops are merely schematically shown lobe-like or as ovals. The closed end of each of the loops, for example the apex region, all point in the same direction, which is toward the left in FIG. 8, whereas the open ends, or lobe foot lie at the right end of each loop. The coupling of two neighboring loops to one another is respectively effected by a further loop that is essentially identical to the loops S1*f* through S4*f* and comprise an orientation essentially opposite that of the loops S1*f* through S4*f*. Thus, the apex or the closed end of the coupling loops points toward the right in the haul-off direction AZ. Thus, for example, the first loop S1*f* is linked to the second loop S2*f* by a connecting loop S2*f that, for example, corresponds to the tie length section AB2 of FIG. 7 or VB1 of FIG. 29**. This loop S2*f** is formed in that, for example, the side branch LA2* on the left of the loops S2*f* in the haul-off direction AZ has its extension wrapping the apex region of the first loop S1*f* and is reversed in the running direction and, when viewed opposite the haul-off direction AZ, forms the right loop branch RA2* of the loop S2*f**. This loop branch RA2* merges into the left side branch SA32 of the third loop S3*f*. The connecting loop S2*f** between the first loop S1*f* and the third loop S2*f* thus comprises the two loop branches LA2* and RA2*. When the loop chain SS is drawn taut, then, respectively, the three loop branches, i.e., the three lines of the one retainer element HE, lie essentially parallel next to one another in the plane of the drawing of FIG. 8. In detail, the right-hand loop branch SA22 (as seen in the haul-off direction AZ) of the second loop 82*f* as well as the two loop branches of the connecting loop S2*f** form the second loop S2*f*.

Figure 9:
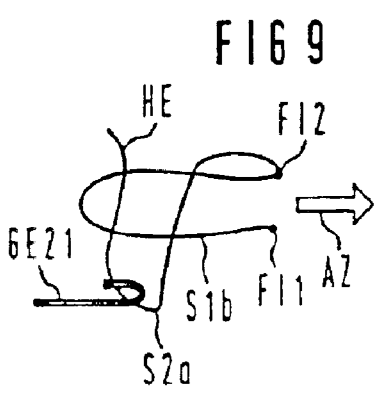
FIGS. 9 and 10 are schematic spatial illustrations of details for forming the chaining process between two successive loops of a loop chain of FIG. 8.

When one tracks the laying course of the retainer element HE in FIG. 8 beginning from its end EN at the right side of FIG. 8 and moves toward the left and opposite the haul-off direction AZ, then the following relationship occurs, expressed in general terms:

The loop chain SS of FIG. 8 is continuously formed by loop turns of one and the same retainer element HE that change orientation in respective succession and are interlaced in one another In terms of the principle, FIG. 9 shows an enlarged illustration of how the second loop S2*a* is pushed or plugged through the inside of the edging of the first loop S1*b* of FIG. 2 and is held by the gripper element GE21. The second loop S2*a* thus preferably penetrates the loop area bounded by the edging of the first loop S1*b* and moves approximately perpendicular thereto.

Figure 10:
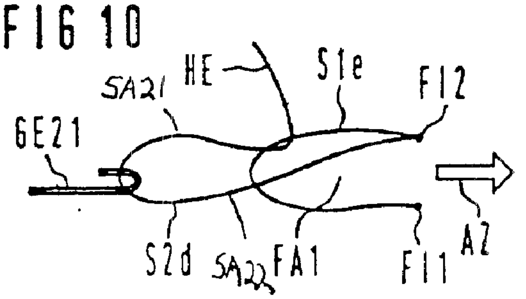

In a schematic enlarged illustration, FIG. 10 shows how the second loop S2*d* of FIG. 5 is pulled through the inside of the first loop S1*e* of FIG. 5 and is aligned with essentially the same orientation relative to the first loop S1*e* opposite the haul-off direction AZ and is drawn taut. Both loops S1*e* as well as S2*d* in FIG. 10 lie following one another in a common laying plane essentially aligned with one another. In that the gripper element GE21 is arranged stationary viewed in the longitudinal direction and the two laps or loops S1*e* and S2*d* coupled to one another are entrained in the haul-off direction AZ by the bundle KS, the second loop 52*d* is aligned analogous to the first loop 51*e*. The two loops S1*e* and S2*d* are cinched or drawn taut to form a radially acting retaining force for the leads of the bundle KS.

The second loop S2*a* is thus passed through the first loop S1*b* of FIG. 9, which has been held open, and is then aligned or, respectively, oriented opposite the haul-off direction AZ toward the left with the assistance of the gripper element GE21 of FIG. 10 corresponding to the preceding, first loop S1*e*. In other words, this means that the apex region of the second loop S2*d* lies in the left half of the respective loop, just as in the case of the first loop S1*e*. The second loop S2*d* of FIG. 10, thus, essentially forms an identical continuation of the first loop S1*e* by duplication. Expressed in general terms, the linking or coupling of the two loops S1*e* and S2*d* is achieved in that the following, newly-formed loop is respectively looped or pulled through the preceding loop. The loop formation thus occurs opposite the haul-off direction, i.e., from right to left in FIGS. 9 and 10. Viewed opposite the haul-off direction AZ in FIG. 10, the left loop branch SA22 of the second loop S2*d* forms the continuation of the right loop branch of the first loop S1*e*. The right loop branch SA21 of the second loop S2*d* likewise crosses the apex region of the first loop S1*e* in its extension. Both loop branches of the second loop S2*d* thus penetrate the area FA1 enclosed by the first loop, for example are looped through the first loop S1*e*. The right loop arm or loop branch SA21 of the second loop S2*d* thus wraps the first loop S1*e* in the apex region thereof, whereby the course of the right loop branch SA21 experiences a directional reversal toward the left, for example opposite the haul-off direction. As a result thereof, a firm coupling of the two loops S1*e* and S2*e* is obtained when the second loop S2*e* is pulled with the assistance of the gripper element GE21. Due to the bending over of its right loop branched opposite the haul-off direction AZ, for example toward the left, the second loop S2*d* can no longer be pulled open or undone, since the second loop S2*d* is held by the gripper element GE21. After being looped through the apex region of the first loop S1*e*, the end of the retainer element HE coming from the supply reel is thus bent over toward the left opposite the haul-off direction AZ. Since the two loops S1*e* and S2*d* are continuously conveyed forward toward the right with the bundle KS, the loop branches of the second loop S2*d* are automatically placed under tension, for example the loop S2*d* is cinched. The gripping element GE21 holds the loop S2*d* fast until a new, third loop has been pulled through the second loop S2*d* for the formation of the new third loop.

The chronological motion sequence of the guide means corresponding to FIGS. 1–7 for forming the first loop cycle with the loop structure SS2 according to FIGS. 24, 29 and 30 as a result around the core given a direction of view in the haul-off direction AZ is shown schematically in FIG. 11. Elements taken unmodified from FIGS. 1–7 are thus provided with the same reference characters. The loop laying according to FIGS. 1–7 is implemented in alternation with respect to the longitudinal extent of the cable core KS, for example, respectively, one loop is formed on the left and alternating therewith the other is formed on the right side of the bundle KS. For example, the guide means in FIG. 1, given the direction of viewing in the haul-off direction AZ, is first moved downward in the direction TVU tangentially to the outside circumference of the bundle KS through the first loop S1*a*, which is held open by the gripper element GE11 to form the second loop S2*a*. As soon as the second loop S2*a* has been pulled through the first loop S1*b* of FIG. 2, the second loop is seized by the gripper element GE21 and the guide means FV2 of FIG. 2 is again moved upward in the direction TVO. Subsequently, the guide means is moved from the right side in the direction TH to the left onto the other or left side of the bundle KS, which direction is perpendicular to the upward as well as downward stroke. During this movement, the second loop S2*a* just formed is pulled ahead counter-clockwise opposite the haul-off direction AZ by about 180° onto the other or opposite side of the bundle KS with the gripper element so that it places itself helically against the elongated traversing bundle over a sub-length. At the opposite side, a new loop, for example S3*a* in FIG. 6, is formed analogous to the opposite side by a downward as well as upward stroke indicated by the downward arrow THU and the upward arrow THO, and this new loop is then conducted through the second loop. In the right half of FIG. 11, a portion of the first loop S1*a* of FIG. 1 is shown and is rotated out of the image plane of the drawing by approximately 90° in order to be able to illustrate the looping of the new loop better. Corresponding thereto, the second loop S2*d* of FIG. 5 is partially shown on the left-hand side of the bundle KS in the same manner. The loops S1*a* and S2*d* both extend about parabolically or as an oval with a privileged direction along the longitudinal axis of the bundle KS. After the formation of the loop S2*d*, the guide means is returned onto the right side, and this is indicated by the motion arrow TV. The motion directions TVU/TVO and THU/THO, as well as the direction TH/TV of the guide means together with the haul-off direction AZ of the bundle, thus, particularly correspond to the coordinate axes of a Cartesian, rectangular coordinate system.

It can also be potentially expedient to have the guide means move back and forth around the outside circumference of the cable core KS on a partial arcuate segment. This is indicated in FIG. 11 with a double-arrow RO. In particular, the guide means is conducted around the outside circumference of the bundle KS through approximately 180° segment of a circle. For the implementation of the change in the side during loop laying, in addition, it can also be adequate to subject the guide means to an excursion only toward the left and then toward the right relative to the longitudinal axis of the bundle in a fashion of a pendulum.

Whereas the respective change with respect to the allocation of the respective sides of the bundle KS is implemented with the guide means, the loop respectively newly formed on each side is expediently brought around to the opposite side, for example, the side lying opposite thereto, with the same winding sense as a previously-produced loop. What this means, in other words, is that the loop respectively newly attached to the loop chain is pulled over the outside circumference of the bundle KS in the same rotational sense to the opposite side. This can be accomplished, for example, in that a single gripping element preferably continuously rotates around the outside circumference of the bundle with the same rotational sense and respectively seizes a newly-formed loop on each side of the bundle and pulls this to the opposite side and holds it open until a new loop is pulled therethrough. Then, the new loop is seized by the same gripper element and, with the same rotational sense as the preceding loop, this is pulled back to the other side for continuing the chaining process.

In addition to and independent thereof, it can also be expedient to allocate more than one loop to a respective long side in immediate succession and to change sides only thereafter. Respectively, between 1 and 10 loops can be used to cover half of a turn, however, it is preferred that two loops are used per side and chained to one another and allocated to, respectively, one half of the outside circumference of the bundle KS. As warranted, it can also be expedient to statistically distribute the immediately succeeding loops on the respectively allocated long side of the bundle. As a result thereof, the topical geometry of the retaining element or loop distribution becomes more uniform.

The loop laying according to FIGS. 1–11 preferably occurs in the same spatial location at the respective long side of the bundle KS. By contrast thereto, however, it can I also be potentially advantageous to produce the respective loop at different, discrete circumferential positions upon retention of the same longitudinal position at the outside circumference of the travelling bundle KS. To that end, for example, the guide means is continuously guided completely around the outside circumference of the bundle; for example, it rotates around the bundle KS.

Figure 28:
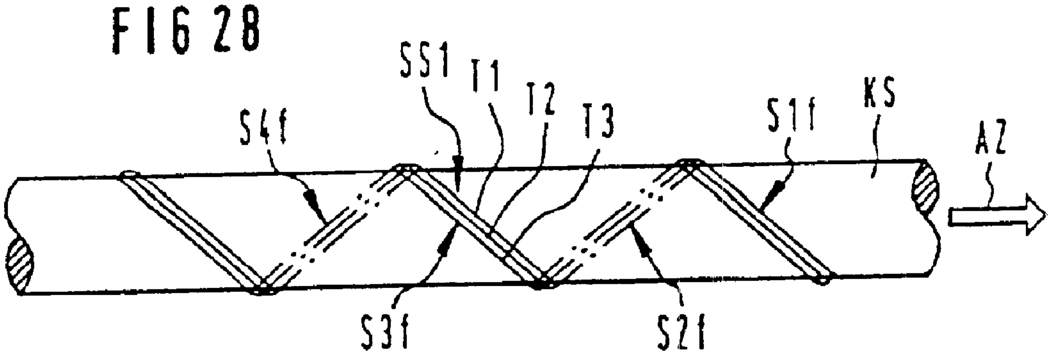
FIG. 28 is a schematic top plan view of a bundle helically surrounded with a loop chain according to the embodiment of FIG. 8.

It can thereby be especially expedient to have the gripper element together with the guide means rotate around the bundle Ks. In particular, the gripper element continuously rotates respectively 360° around the longitudinal axis of the bundle KS synchronized with the guide means. As a result thereof, the loop structure SS of FIG. 8 is conducted around the longitudinal extent of the bundle KS in the form of a helical coil. FIG. 28 shows such a structure in a schematic plan view, whereas it is referenced SS1. Sub-sections of the structure SS1, which are on the under or back side of the bundle KS, are shown in dot-dashed lines. A sawtoothed course for the structure SS1 occurs given a common observation of upper and lower sides. It respectively comprises three lines, especially threads, such as, for example, T1, T2 and T3 given the loop S3*f*, that lie approximately parallel to one another, namely consist of two loop branches as well as a tie length section for the next loop in detail. Differing from the structure SS2 of FIG. 29, thus, a circular sling around the outside circumference of the bundle is not formed at every second loop as shown in the arrangement of FIG. 29. However, the same loops of the three element types SU1 in FIG. 29 are continuously attached to one another so that a helical coil is obtained. As a result thereof, a 360° revolution around the bundle KS by the retaining element HE is implemented only after two loops, such as, for example, S1*f* and S2*f*.

The retainer element HE can also be potentially wrapped around the bundle KS in loop form in that the bundle KS itself is placed in rotation. Particularly for forming, for example, the loop structure SS1 of FIG. 28, the remaining elements, for example the supply reel, the guide means as well as the gripper elements, can then be attached in a stationary position in the longitudinal as well as circumferential direction. A new loop can thereby be respectively formed at one in the same location as the bundle is rotated on its axis.

Figure 31:
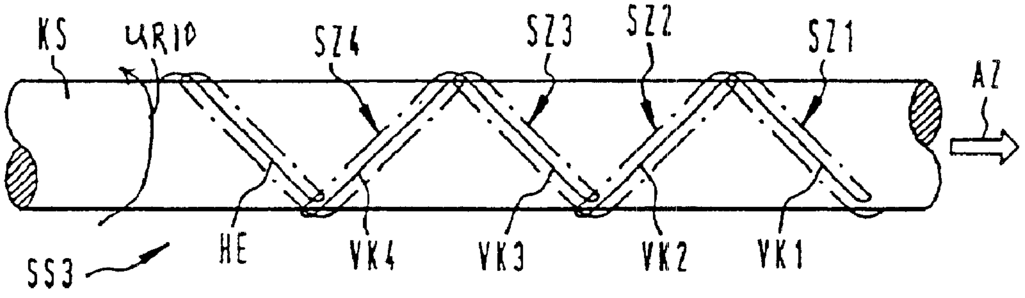
FIG. 31 is a schematic top plan view of a bundle that has been enveloped by a modified loop chain as compared to FIGS. 28–30.
Figure 32:
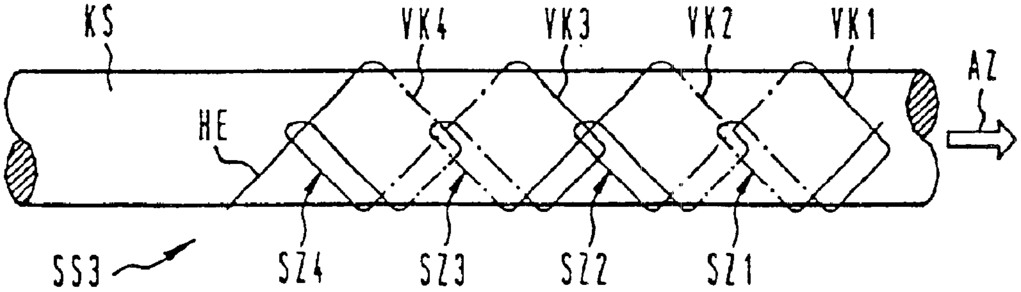
FIG. 32 is a schematic side view of the bundle of FIG. 31 which has been rotated approximately 90° on the axis of the bundle.

An additional, especially preferred loop structure SS3 is illustrated in FIGS. 31 and 32 and can be produced in that the guide means is moved alternately back and forth with respect to the sub-halves of the bundle and, at the same time, the gripper element changes location corresponding thereto with respect to the sub-halves of the bundle lying there opposite. For example, the guide means can thus be allocated to the upper side of the bundle, particularly a circumferential angular range between 0° and 180°. The gripper element is then particularly assigned to the opposite side, preferably the under side or bottom of the bundle, and, thus, to a circumferential angular range between 180° and 360°. The change in sides of the guide means and the gripper element can respectively occur on a sub-section of an arc of a circle in a circumferential direction. Thus, a reciprocating motion of the guide means in a circumferential direction is indicated with a double-arrow RO in FIG. 11, and the reciprocating motion of the gripper element in circumferential direction is also indicated with a double-arrow GO. As soon as a loop has been formed by the guide means at one side of the bundle, for example on the left side, as illustrated in the haul-off direction AZ, the gripper element hooks into the loop. The gripper then pulls the loop down around the bundle onto the opposite, right-hand side in a counter-clockwise direction from left to right. Above the bundle, the guide means is likewise moved from left to right simultaneously or, respectively, synchronously therewith to arrive on the right side of the bundle as the gripper element also arrives. The gripper element now will form a loop and hold it open on the right-hand side of the bundle as the guide means forms a new loop to pass through the loop held by the gripper element. The gripper element will seize the new loop and then pull it back onto the left side of the bundle in a clockwise motion as it moves from right to left around the bottom of the bundle. At the same time, the guide means will shift from the right to the left above the bundle, so that the guide means again pulls a new loop through the loop held open by the gripper element and a new motion cycle of the guide means and gripper element can begin. The guide means thus executes a type of pendulum motion from one to the other sides of the bundle with respect to a sub-section of the outside circumference of the bundle. Corresponding thereto, the gripper element also executes a type of synchronous pendulum motion from the one side to the other side of the bundle with respect to a sub-section of the outside circumference of the opposite side. Thus, the gripper element does not rotate around the entire outside circumference of the bundle, such as, for example, for forming the structure SS2 of FIGS. 29 and 30, but merely moves back and forth with respect to the sub-section of the outside circumference of the bundle. The reciprocating motion of the gripper element under the bundle preferably occurs so rapidly that the guide means above the bundle can still be conducted through the respective loop held open by the gripper element. The pendulum motion of the gripper element thus particularly occurs somewhat faster than the pendulum motion of the guide element. In a simplified view, however, the movement of the guide means from left to right also corresponds to the left to right movement of the gripper element and a right to left movement of the guide means also corresponds to the right to left movement of the gripper element. Thus, an essentially synchronism between the reciprocating motion of the guide means and the gripper element will be present.

The loop structure SS3 is formed in this way, and is schematically shown in a top plan view in FIG. 31 and a side elevational view in FIG. 32, which has the bundle KS rotated approximately 90° in the direction of arrow UR10 of FIG. 31. The loop structure SS3 essentially has the slings that are respectively formed analogous to the slings at every second location of the loop structure SS2 of FIGS. 29 and 30, but these are continuously attached to one another in the arrangement of the loop structure SS3. The two-element loops, for example SZ1 through SZ4, are respectively laid on the underside of the bundle KS. In FIG. 31, such loops have two loop branches, especially threads, that are attached to one another zig-zag-shaped or, respectively, sawtoothed-shaped only on the lower half of the bundle KS. These loops SZ1 through SZ4 are indicated in dot-dashed lines in FIG. 31, since they are underneath the bundle KS. The coupling of the two successive loops occurs in that the respective one of the two loop branches of the loop is looped through the closed end of the preceding loop and the extension thereof, such as the tie length section, does not proceed on the under side of the bundle but on the upper side of the bundle parallel to the two threads of the loops SZ1 through SZ4. The respective tie length sections thus extend from one side to the other over the upper portion of the cable, as illustrated in FIG. 31, and correspond to the allocated loops conducted around the bottom surface. The tie length sections, for example VK1 through VK4, are therefore shown in FIG. 31 in a solid line. After changing sides, the respective tie length section is looped through the closed end of the loop conducted around the bottom and the extension of the tie length merges into one of the side branches of the next loop. In that a respective tie length section is conducted around to the opposite side of the bundle like the bipartite loop and is pulled through the closed end of this loop, a sling for the traversing bundle is respectively formed all around the entire outside circumference of the bundle.

This sling formation is more evident from FIG. 32. Those portions which are not visible because of being on the back side of the bundle are shown in dot-dashed lines. The bipartite loop, such as, for example, SZ1, respectively proceeds in alternation from, for example, the front side to the back side of the bundle KS. The next loop viewed opposite the haul-off direction AZ, such as, for example, SZ2, then, in turn, proceeds from the back side to the front side of the bundle KS. Viewed spatially, thus, the respective loop, such as, for example, SZ1, is conducted around the lower half of the outside bundle circumference counter-clockwise, for example with a right-hand thread as viewed opposite to the haul-off direction AZ, from the front to the back on an approximately half-wave or half period of a helical line. The loop SZ2 is conducted around the under side of the bundle from the back side to the front side thereto with a left-hand thread and in the approximate shape of half of a helical coil. The other loops follow corresponding to the arrangement of this loop pair SZ1 and SZ2. On the back side of the bundle KS, the extension of the tie length section VK1 of the loop SZ1 merges into one of the two loop branches of the loop SZ2. The other loop branch of the loop SZ2 is conducted through the closed end of the loop SZ1 and the continuation is pulled from the back to the front over the top of the bundle as a tie length section VK2. The tie length section VK2, finally, is pulled through the closed end of the next loop SZ2, which is conducted around on the bottom to the front side. Together with the tie length section conducted around the top as one part of a "top thread", the loop SZ2 conducted around the bundle at the bottom forms a sling through whose inside the bundle proceeds. Since such a sling proceeds ring-like around the entire outside circumference of the bundle and can be cinched in the direction toward the central axis of the bundle, a retaining force can be especially reliably applied to the individual elements of the bundle. At the same time, the respective tie length section, such as, for example, VK2, effect the coupling of the respective loop, such as, for example, SZ2, to the preceding loop, such as SZ1, as well as to the following loop, for example SZ3. The extension of the respective tie length section, such as VK2, respectively merges into one of the two loop branches of the following loop, such as SZ3. At the same time, the tie length section VK2 is looped through the closed end of the preceding loop, such as SZ1. Corresponding to the course of the two-line loops SZ1 through SZ4 on the underside of the bundle, the one-line tie length sections VK1 through VK4 thus proceed on the upper side of the bundle, for example a change of the sides of the loop at the under side is followed parallel to the change of the sides of the tie length section on the upper side. Corresponding to the plan view of FIG. 31, a two-line, particularly two-thread zig-zag or, respectively, sawtoothed pattern thus occurs on the under side and the one-line on the upper side has a sawtoothed pattern that corresponds to the sawtoothed pattern of the loops on the bottom side. Viewed overall, the structure SS3 in FIG. 32 appears as a rhomboidal pattern with a two-line bottom thread as well as a one-line top thread.

In terms of principle, the loop structures SS1 through 8S3 of FIGS. 28–32 are respectively essentially based on the structure SS of FIG. 8. They differ only on the basis of the spatially different types of laying via the tie sections. In FIG. 28, a three-line loop chain SS1 winds helically around the elongated bundle, for example the tie length sections of the loops run helically around at the outside surface of the bundle in essentially the same direction as the two-line loops. In the structure SS2 of FIGS. 29 and 30, by contrast to FIG. 28, a three-line loop alternates after half a respective helical revolution with a ring-shaped sling that is respectively composed of a one-line "top thread" and a two-line loop on the other side of the bundle. The "top thread" is thus respectively formed by the tie length section to the next loop. It is laid oppositely relative to the appertaining loop with about the same helical pitch as well as the reverse winding sense on the upper side and, thus, is in a different spatial plane. The loop section SS3 of FIGS. 31 and 32, finally, is composed only of such ring-shaped slings that proceed helically or, respectively, coil-like.

Over and above this, the loop structure of FIGS. 28–32 can also be potentially combined with one another in an arbitrary way. In addition to the closed loop structure, of course, other loop structures can also be produced according to the inventive method.

Respectively, only between one and six, and preferably between one and three threads, preferably proceed on the outside circumference of the bundle. Viewed overall, advantageously at least 60%, especially at least 70% of the total surface of the bundle remains uncovered by the retainer element. Preferably, it is in a range of 90% to 98%, with the preferred range being 90% to 95% of the total surface of the bundle is free or open after the longitudinal application of the retainer element.

Expressed in general terms, the loop structure of the retainer element HE all around the bundle KS can be particularly produced in that at least one guide means, such as, for example, FV1 of FIG. 1, and at least one gripper element, such as, for example, GE11 of FIG. 1, are mounted movable relative to one another and/or relative to the bundle in a circumferential direction. Instead of the left/right movement TH/TV of the guide means and the upward/downward stroke TVO/TVU, THO/THU thereof, it can also be expedient to subject the bundle KS to excursion toward the left or the right and to move it up or down.

In addition, it is also potentially expedient to employ at least one suction tube for suctioning or a blower for blowing instead of the gripper element. Thus, newly formed loops will either be sucked onto or, respectively, blown onto a side of the bundle, such as with compressed air.

The type of loop laying corresponding to FIGS. 1–11 is especially distinguished in that a continuous rotational movement of the supply reel VS for the retainer element HE along the longitudinal axis of the bundle KS is avoided. Problems in regulating centrifugal force and tensile force that can occur given traditional retaining helix spinners or central helix spinners are thus eliminated. Great centrifugal masses, namely, no longer need to be moved around the bundle KS. As a result thereof, it is possible to apply, for example to guide, the retainer element HE around the bundle KS in a longitudinal direction in a particularly easy manner. In particular, the bundle KS can be provided especially quickly with the retainer element HE. At least 5,000 loops, preferably between 1,000 and 10,000 loops or, respectively, laps can be advantageously laid per minute. The inventive loop-laying technique makes it advantageously possible to apply at least one retainer element for holding the bundle together to the bundle KS given haul-off speed of more than 50 m/min.

In addition, it is no longer necessary, given the invention, to stop the assembly line of the bundle KS in order to install a new reel for the retaining element. Thus, an endless fabrication can be obtained. Since the supply reel for the respective retainer element is mounted stationarily I it is adequate to merely join the end of the retaining element that has been used up to the start of a new retaining element of a new stationary and fully-supplied reel. In particular, the balancing of mechanical mass and tensile forces is assured, and this makes expensive sensor mechanism as well as high-dynamic drives unnecessary or superfluous.

While the loop-laying of the retainer element HE according to FIGS. 1–10 is implemented with only a single retainer element HE, an additional lapping method with a loop-laying apparatus SLV2 that works with two different retainer elements, for example with at least one additional retainer element, is disclosed in FIGS. 12–15. Elements from FIGS. 1–11, which are unmodified, are provided with the same reference characters in FIGS. 12–15. As illustrated in FIG. 12, a first retainer element HE is hauled off from a stationary supply reel VS1 in the left half of the Figure and is pulled through the passage OP of the guide means FVU. The starting end of the first retainer element HE1 is mechanically fixed to the outside circumference of the bundle KS and, for the sake of simplicity, this is only schematically illustrated by a dot referenced FI3 in FIG. 12. In FIG. 12, the guide means FVU presses or moves the first retainer element HE1 down onto a front side of the bundle KS in the form of a triangular bellied portion, so that a first loop or, respectively, lap SV1 a is formed. A gripper element GEV1 intervenes to engage the first loop SV1 a so that the first loop is held given the subsequent upward motion of the guide means FVU. The upward motion of the guide means FVU is indicated by the arrow TVO. At the same time, a second retainer HE2 is hauled off from a second stationary or, respectively, locally fixed supply reel VS2 with the assistance of a second guide means FM. The second guide means FM serves the purpose of looping the second retainer element HE2 through the first loop SV1 a that has just been formed.

FIG. 13 shows the condition of the loop-laying apparatus SLV2 after the guide means FVU of FIG. 12 was moved into a position FVO above the bundle KS. Since the first loop SV1*a* of FIG. 12 is held fast with the assistance of the gripper element GEV1, with the closed end or apex region of the loop SV1*a* in a fixed position, and the starting end of the first loop SV1*a* simultaneously entrained by the bundle KS in the haul-off direction AZ due to the mechanical fixing F13, the first retainer element HE1 continues to be hauled off from the supply reel VS1. The gripper element GEV2 thus opens the first loop SV1*b* of FIG. 13 to such an extent that the second guide means FM together with the respective retainer HE2 fastened thereto can be pulled through the first loop SV1*b*. This passing of the second retainer element HE2 through the first loop SV1*b* is shown with a portion DF1 through the loop SV1*b*. Expediently, a length storage or take-up device SPE for the first retainer element HE1 is provided between the supply reel VS1 as well as the guide means, and this is only shown in dot-dashed lines in the Figure. The take-up device SPE serves the purpose of offering compensation of length of the retainer element HE1 to the same extent to which its running length is lengthened or shortened. As a result thereof, an essentially constant tension is achieved for the retainer element HE1 during its loop formation. The second guide means FM is preferably formed by a shuttle that is "shot" through the respectively formed loop of the first retainer element.

After the guide is moved to the position FVO in FIG. 13, it is then shifted in the direction of the arrow TH to the back side of the bundle KS to wrap the retaining element HE1 over the top of the bundle. Then, the guide is moved downward in the direction of the arrow THU to a position FHU (FIG. 14) to form a new, second loop SH2*a*. The second loops SH2*a* is formed in what is the left side of the bundle KS as seen in the haul-off direction AZ. This newly-formed loop SH2*a* is indicated in dot-dashed lines, since most of it has been obscured by the bundle. The second loop SH2*a* is held fast by a gripper GEH1 so that the newly-formed, second loop SH2*a* cannot, in turn, become undone or open during a subsequent upward motion of the guide means from the position FHU. Since the first loop is moved farther forward with the bundle KS due to the haul-off motion and the side of the bundle was changed with the retainer element HE1, the retainer element HE1 places itself against the outside circumference of the bundle KS essentially in a sinusoidal or, respectively, triangular or approximately in the shape of a sawtoothed curve.

Figure 14:
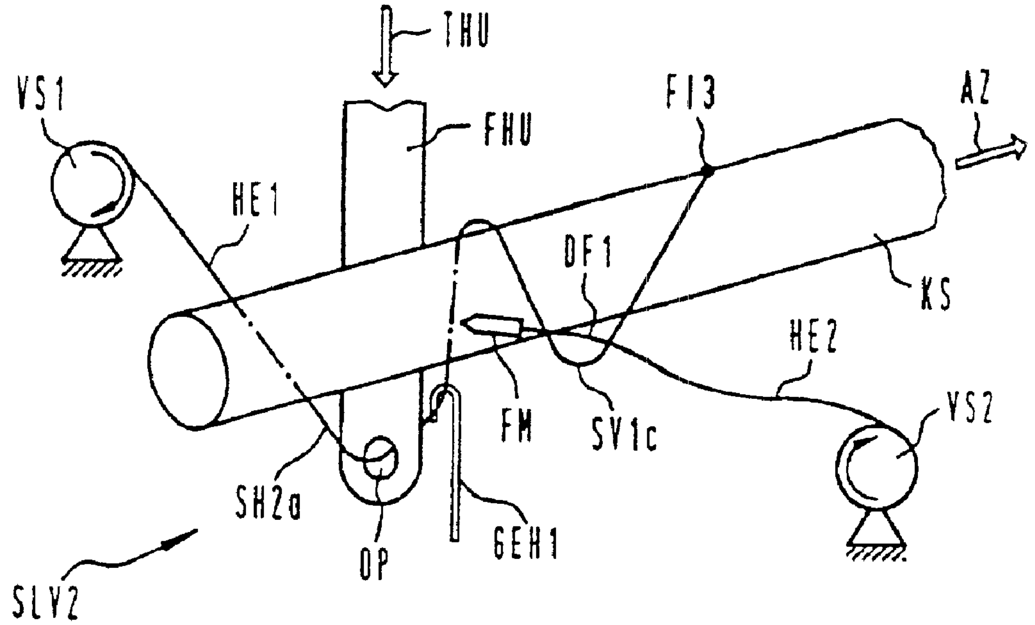

In order to likewise hold the second loop on the outside circumference of the bundle KS, the second guide means FM attached to the second retainer element is likewise passed through the second loop SH2*a* of FIG. 14 while it is being held fast and open by the gripper element GEH1.

Figure 15:
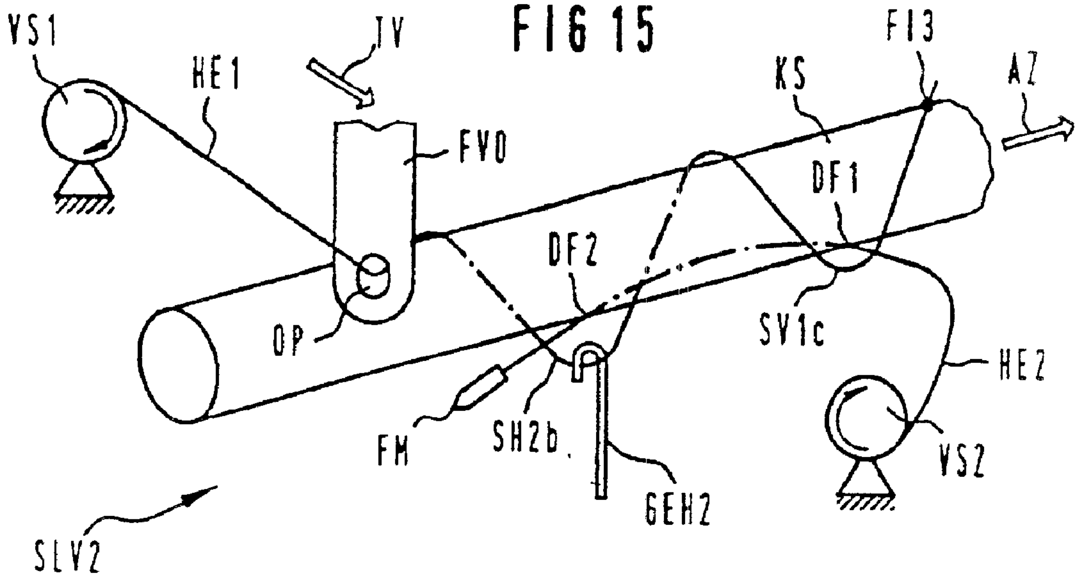
Figure 16:
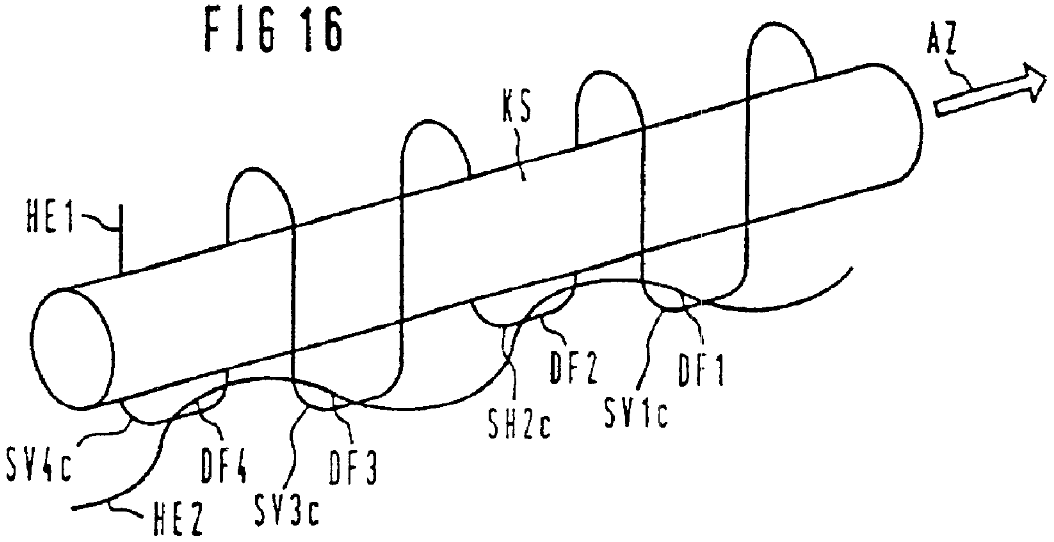
FIG. 16 is a schematic perspective view illustrating the chaining of successive loops of two retainer elements according to the method steps of FIGS. 12–15.

The second retainer element HE2 is thus looped through the second loop SH2*a* according to the above-described principle and, thus, forms a second passage. In FIG. 15, the newly-occurring loop condition of the second loop is referenced SH2*b* and the passage of the second retainer element HE2 is referenced DF2. Since the second loop SH2*b* lies opposite the first loop SV1*c* and is located on the other side of the bundle KS, a change in the direction and, thus, the half-wave of a sine curve is also obtained for the second retainer element HE2. In FIG. 15, the guide means for the first retainer element HE1 is moved upward and then over the bundle to the front side in the direction of the arrow TV so that an additional, new loop analogous to the first loop of FIG. 12 can be formed on the front side. In FIGS. 12–15, the second retainer element HE2 is pulled through the respectively newly-formed loop of the first retainer element HE1, preferably in the direction opposite the haul-off direction AZ of the bundle KS. Due to the forward movement of the respectively newly-formed loop together with the bundle KS, the second guide means FM for passing the second retainer element HE2 through can, in particular, thereby be attached stationarily with respect to the longitudinal position.

Viewed overall, a chaining between the first and the second retainer element thus occurs given continuation of the loop-laying with the first retainer element HE1 and the second retainer element HE2 according to the method of FIGS. 12–15. This is schematically illustrated in a perspective view of FIG. 16, wherein the first retainer element HE1 is respectively placed over the bundle KS in alternation with a loop. The following sequence, for example, occurs: The first loop SV1*c* is arranged at the front side of the bundle KS, the second loop SH2*c* of the retainer element HE1 following thereupon is laid on the back side of the bundle. The third loop SV3*c* is again placed on the front side of the bundle and the fourth loop SH4*c* follows thereupon and is on the back side of the bundle. The retainer element HE1 is thus laid along the longitudinal extent of the bundle KS in a meander or serpentine-like manner respectively, first on the left side and then on the right side of the longitudinal extent. This arrangement is positionally secured in that the second retainer element HE2, on the under side of the bundle KS is respectively looped through the right side as well as the Left side loops of the first retainer element HE1. Due to the alternating arrangement of the loops SV1*c*, SH2*c*, SV3*c*, SV4*c* of the first retainer element HE1 an approximately sinusoidal course occurs in FIG. 16 for the second retainer element HE2 with the passages or portions DF1–DF4, the passages DF1–DF4 thereby lie approximately at the reversing points of the approximately sinusoidal or, respectively, serpentine course of the retainer element HE2.

Figure 17:
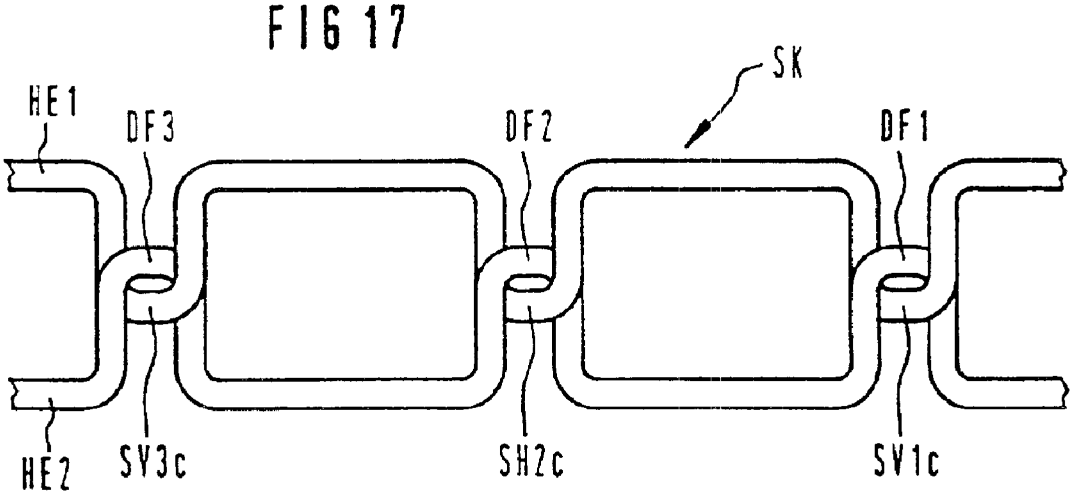
FIG. 17 is an enlarged plan view schematically illustrating the loop chain of FIG. 16 in a common laying plane.

FIG. 17 shows the coupling of the plurality of loops of the two retainer elements HE1 and HE2 to one another in an imaginary, common laying plane. The approximately rectangularly laid loops, such as, for example, SV1*c*, SH2*c*, SV3*c* of the first retainer element HE1 in FIG. 17, as well as the passages, such as, for example, the loops DF1 through DF3 of the second retainer element respectively cross and are wrapped around each other and thereby form a non-releasable connection or, respectively, loop chain SK with one another. Due to the crossing of the respective loop, such as, for example, SV1*c* of the first retainer element as well as the respectively allocated passage or loop DF1 of the second retainer element HE2, a chaining of the two retainer elements HE1 and HE2 is obtained. As a result thereof, the loops of the two retainer-elements HE1 and HE2 can be respectively cinched or tightened so as to create radially-acting retaining forces for the leads of the bundle. Viewed overall, wrapping of the bundle KS around the outside circumference along the longitudinal extent can be produced in the fashion of a cross helix without requiring a rotation of the supply reel VS1 and/or the second supply reel VS2 along the outside circumference of the bundle KS.

The movement of the guide means for the retainer element HE1 can thus be implemented analogous to the guide means for the retainer element HE of FIGS. 1–10. The gripper element GEH 1 for seizing loops at the front side of the bundle KS is preferably attached stationary. The same is true of the gripper element of the respective loops of the first retainer element HE1 on the back side of the bundle KS. In addition, it can also be potentially expedient to employ only a single gripper element, this is then moved from the front side to the back side for seizing the respectively newly-formed loops.

Another possibility on how respective loops of the first retainer element HE1 can be laid and how the second retainer element HE2 can be pulled through the newly-laid or formed loops of the first retaining element is schematically illustrated in FIGS. 18–23. The respective, newly-derived sub-conditions for the individual, newly-formed loops of the first retainer element HE1 are identified in FIGS. 18–23 with alphabetically consecutive lower case letters a–e in the reference character. In addition, the generated loop chain SK of FIG. 17 is additionally co-entered in an imaginary, common laying plane.

Figure 18:
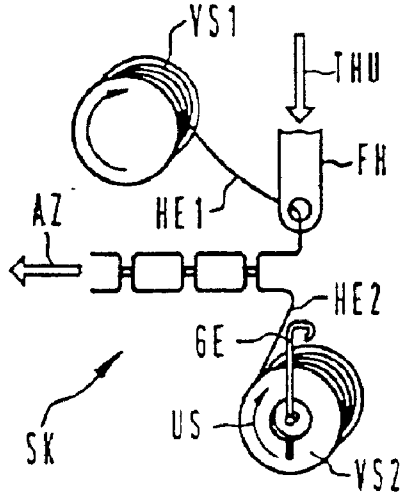
FIGS. 18–23 are schematic diagrammatical views of a modification of the method steps as well as the elements of loop-laying apparatus of FIGS. 12–15.
Figure 21:
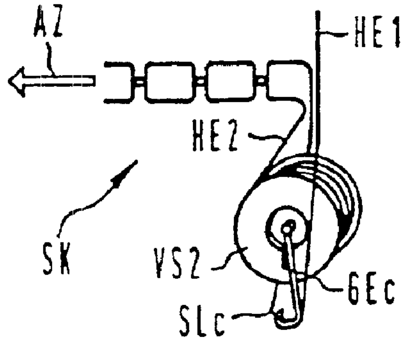
Figure 19:
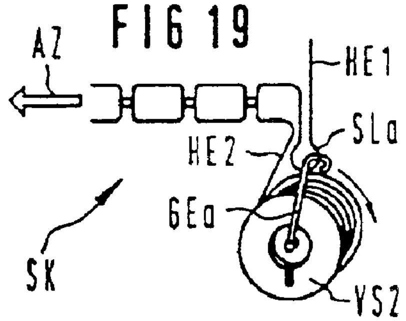
Figure 22:
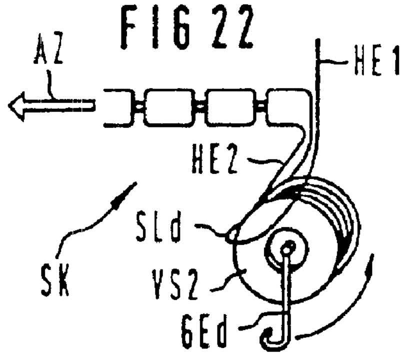
Figure 20:
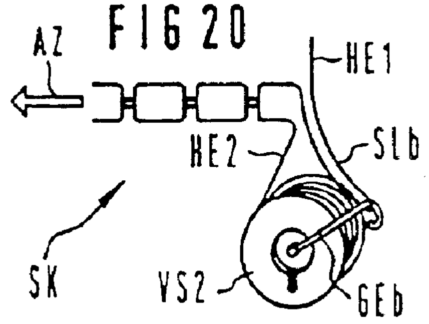
Figure 23:
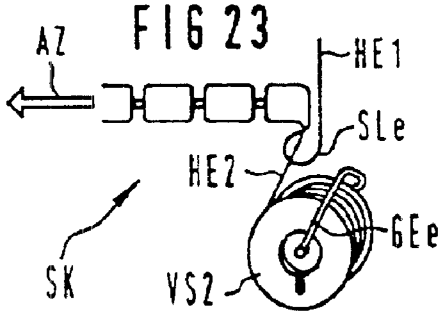

As illustrated in FIG. 18, the guide means FH is moved down in the direction THU so that a first retainer element HE1 is hauled off from a stationary supply reel VS1. The second supply reel VS2 for the retainer element HE2 is arranged opposite the guide means FH at the other side of the loop chain SK that lies at the bottom in FIG. 18. A gripper element GE is arranged at this supply reel VS2 to rotate in a clockwise direction US. The gripper element GE is fashioned hook-like in FIG. 18 and rotates around the axis of the stationary supply reel VS2. For seizing the retainer element HE1, the gripper element GE is situated at about a 12 o'clock position in the path of the guide means FH. As soon as the guide means FH has been moved far enough down toward the supply reel VS2, the gripper element GE, due to its clockwise motion, hooks into the retainer element HE1 at the eyelet of the guide means FH and thereby pulls a loop that is referenced SLa in FIG. 19. As soon as the gripper element GE has seized the loop SLa of the retainer element HE1, the guide means FH can be retracted upward. Due to the rotational movement of the gripper element GE, the retainer element HE1 continues to be hauled off from the supply reel VS1 so that the loop SLa is enlarged to form a loop SLb, as shown in FIG. 20. Due to the rotational movement of the gripper element GE, the loop SLb is enlarged up to about the 6 o'clock position of the gripper element GE. The loop SLb is looped over the supply reel VS2. At the same time, the gripper element GE is unhooked from the loop SLc of FIG. 21 following the 6 o'clock position. The gripper element GE is then moved back counter-clockwise into its 12 o'clock position for engaging and pulling a new loop. Since the loop SLc is no longer held and the loop chain SK continues to be conveyed forward in the haul-off direction AZ, the loop SLc becomes smaller, i.e., is automatically tightened or cinched toward the size of a loop SLd of FIG. 22. Since the supply reel VS2 is pulled through the loop SLd in the fashion of an over-end unwinding, its retainer element HE2 is simultaneously passed through the loop SLd as well, so that a cross-wise chaining or, respectively, an interlacing as shown in FIGS. 14–17 is formed. FIG. 23 shows the cross-wise wrap between the loops of the first retainer element HE1 and the second retainer element HE2.

This method is distinguished over the loop with only a single retainer element according to FIGS. 1–7 and 28–32, particularly in that less thread length is used overall and the connection is far more difficult to undo by pulling on the threads. It advantageously comprises two supply reels that do not rotate around the bundle KS, but are arranged stationarily and are supplied independently of one another. Their circumferential speed around the rotational axis of their respective reels preferably lies on the order of magnitude of the haul-off speed of the bundle.

Expressed in summarized fashion, a retainer element, particularly a thread for holding the bundle together, is hauled off from one of these two supply reels, is shaped to form a sling and is penetrated by the retainer element of the other supply reel or wraps the other retainer element so that a non-releasable connection of the two threads occurs and a continuous seam is formed around the bundle to be lapped.

As illustrated in FIG. 24, an electrical and/or communication cable KA will include a circular-cylindrical central element ZE, around which electrical or optical transmission elements, such as leads AD1 through ADn, are applied with a long lay or SZ-stranded so that the cable core KS1 is formed. In order to avoid an opening of this union insofar as possible, the retainer element HE with the laying structure SS2 according to" FIGS. 1–10 is helically applied around the cable core KS1. The loop-like chaining or laying structure SS2 of the retainer element HE corresponds to that of FIGS. 29 and 30. A single-layer or multi-layer outside plastic cladding AM is applied around the cable core KS1 held together in this way by the retainer element HE.

The cable KA is illustrated in cross section in FIG. 25 and includes leads AD1–ADn, which are arranged around the preferably approximately circular-cylindrical central element ZE. For example, a tensile plastic skein or aramid or steel wire fibers stranded with one another can be selected as the central element ZE. Electrical conductors that are surrounded with a plastic insulation can, for example, be selected as leads AD1–ADn. For the sake of clarity, only three leads AD1–AD3 are shown in FIG. 25. Additionally, a light waveguide LW is also illustrated in FIG. 25 as the optical lead. The light waveguide comprises an optical fiber LF that is protectively surrounded by a primary plastic protective layer PC, which forms a primary coating, as well as by a secondary plastic protective layer SC, which forms a secondary coating. The bundle KS1 together with the cable elements is held together by a loop configuration of the retainer element HE. Since this is a matter of a chaining of respectively two loops, respectively two webs or lines of, for example, the loop SU2 of FIG. 30 as well as an additional line of the appertaining tie length section VB2, for example of FIG. 30, are visible on the outside circumference of the cable core or bundle KS1 in the cross sectional view of FIG. 25. The tie length section VB2 thereby lies offset relative to the loop by about 180° in the circumferential direction.

As warranted, it can also be expedient to additionally apply an armoring BW to the cable core KS1 held together in this way by the retainer element HE.

The inventive loop-laying method is advantageously suited for applying a retainer element HE in a longitudinal direction given a plurality of different types of cable core. This is also particularly true of cable cores of high-tension cables.

By way of example, FIG. 27 shows an additional embodiment of a cable core KS2 for a communication cable. A profiled element PF comprises chambers KA1 through KAn extending in the longitudinal direction that are respectively radially outwardly opening. The individual chambers KA1–KAn are respectively separated from one another by approximately radially outwardly extending webs ST1 through STn. Electrical and/or optical transmission elements for message transmission can be placed into the chambers of such a chambered element KS2. For example, individual plastic-insulated electrical conductors AD1* through ADn* are loosely placed into the chamber KA1 in FIG. 27. It can be just as expedient to also place light waveguide ribbons BL in the form of a light waveguide ribbon stack BS into the respective chamber KA2. In FIG. 27, for example, the ribbon stack BS comprises an approximately trapezoidal cross sectional geometry. It is composed of individual light waveguide ribbons BL. The individual ribbon BL respectively comprises light waveguides LW along an imaginary straight line that are embedded in the common outside sheath, which mechanically connects the individual waveguides to one another. In order to optimally prevent such electrical and/or optical transmission elements from falling out of the chambers of the profiled element PF, it is likewise expedient to apply a retainer element HE to the cable core KS2 in a longitudinal direction in conformity with the method steps of FIGS. 1–11, 12–17, 18–31 or 28–32. Similar cross sectional-shaped cable core structures can also be utilized in cable technology for high-tension cables.

FIG. 26 shows a schematic partially perspective view of how, given a method according to FIGS. 12–16, the first retainer element HE1 can be laid onto loops at both sides of a bundle KS and can be linked or, respectively, coupled to a second retainer element HE2. The guide means FH for the first retainer element HE1 is located above the upper side of the bundle KS in FIG. 26. It can preferably be respectively allocated to a side of the bundle KS so that, as viewed in the haul-off direction, the respective loop can be placed at the left side and then at the right side of the bundle. The guide means FH can, thus, be respectively moved onto the left or right side with reference to the longitudinal axis LA of the bundle KS. This can be accomplished, for example, by a simple, straight-line displacement of the guide means FH approximately perpendicular to the longitudinal axis LA of the bundle KS. It can be just as practical to move the guide means FH for the first retainer element HE1 arcuately around a sub-section of the outside circumference of the bundle KS. It can also be potentially expedient to implement only a pendulum motion of the guide means FH toward both sides of the bundle KS. These movements are illustrated in FIG. 26 by two arrows UR1 in a clockwise direction and the arrow UR2 in a counter-clockwise direction.

After a loop, such as, for example, SV1*b* of FIG. 13, has been laid on one side of the bundle KS, the second retainer element HE2 is passed through the loop of the first retainer element HE1 with the assistance of the guide means FM. In FIG. 26, for example, the loop SV1 hangs down on the right side of the bundle KS, as viewed in the haul-off direction AZ. The area enclosed by the loop SV1 lies approximately tangentially relative to the outside circumference of the bundle KS. The loop preferably extends down to such an extent that the guide means FM can be passed through in a direction perpendicular to an enclosed edging area of the loop SV1. The guide means is preferably fashioned as a carriage or shuttle that can be moved back and forth from one side of the bundle KS onto the other side on a rail, such as FS. The carriage extends roughly perpendicular to the longitudinal axis LA and extends substantially horizontal. The guide rail FS penetrates the area enclosed by the loop SV1 approximately perpendicular thereto. The guide means FM with the retainer element HE2 hanging therefrom, is moved from the right side SS20 of the guide rail FS to the left side edging SS10 thereof. The retainer element HE is thereby hauled off from the stationary supply reel VS2 and is pulled through the open loop SV1 of the first retainer element HE1. A crossing, for example a wrapping, of the loop SV1 of the first retainer element HE1, as well as of the second retainer element HE2, occurs in this way, as indicated in FIGS. 12–17.

In particular, it can be expedient to shoot the shuttle for the second retainer element through the respective loop of the first retainer element with compressed air or to use a suction air and to catch the shuttle at the opposite side, for example with a magnet. The shuttle can then preferably be shot back into its initial position in "ping pong" fashion. It is also possible that the shuttle is free of a carriage and is shot from one side to the other after being caught similar to a shuttle in a weaving arrangement or loom.

It can potentially be difficult in cable technology to fix a stranded union of a plurality of electrical and/or optical transmission elements, particularly electrical leads and/or light waveguides, on an outside circumference over the length thereof in a reliable way that is simple enough and fast. It is especially important to fix SZ-stranded cable cores in order to prevent an unravelling of the stranded union.

An expedient development of the invention is thus based on the object of disclosing a way of how the cohesion of the electrical and/or optical transmission elements of a stranded product of cable technology in circumferential direction can be improved over the entire length of the stranded product and can be implemented especially simply and fast. This object is advantageously achieved with the assistance of a method for lapping a traversing stranded product of a plurality of electrical and/or optical transmission elements with at least one elongated retainer element in that loops are continuously formed for a plurality of retainer elements, for example a multi-filament principle, at different positions on the outside circumference of the stranded product, and in that these loops are chained to one another. As a result of such a loop structure, the stranded product is advantageously held together in a circumferential direction over its longitudinal extent in a simple and especially efficient way.

Figure 33:
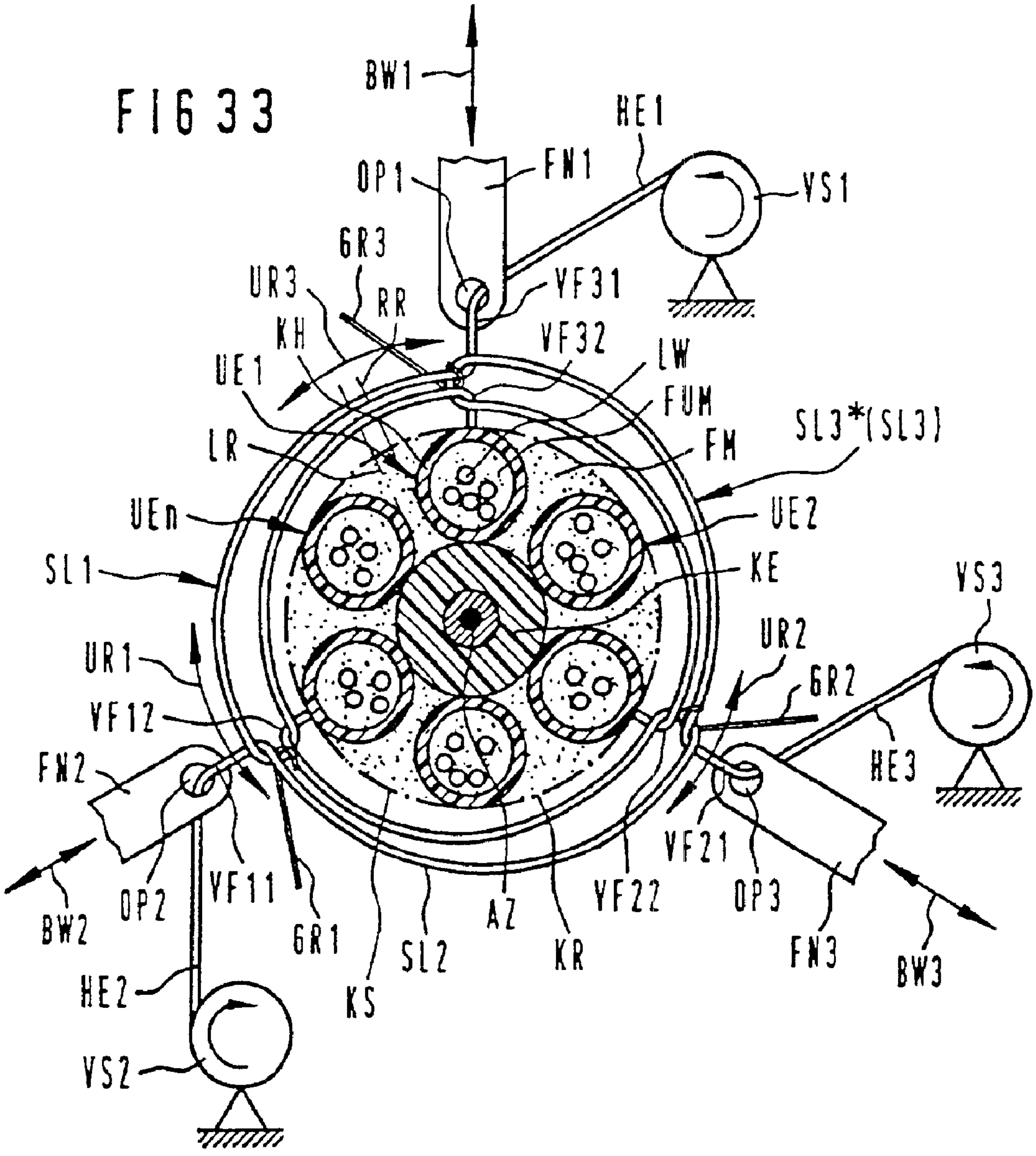
FIG. 33 is a schematic cross sectional view of a stranded product having a plurality of retainer elements on an outside circumference that are linked to form a looped chain.

A cable core KS is shown in cross section in FIG. 33 and extends perpendicular to the plane of the drawing. The cable core KS, for example, is formed in that a plurality of elongated optical transmission elements UE1 through UEn having an approximately round configuration are stranded, especially SZ-stranded, around a central element KE. Spatially considered, the central element KE essentially has the shape of a circular cylinder and, in particular, is fashioned as a tensile element. A cable core KS that approximately comprises an annular outside contour occurs in this way. This outside contour is indicated in FIG. 33 with the assistance of a circle KR, shown in dot-dashed lines. What are referred to as optical bundle leads are provided by way of example as optical transmission elements UE1 through UEn, which are respectively formed by an approximately circular-cylindrical, closed plastic tube KH into which one or more light waveguides LW are loosely inserted. The interior of the plastic tube KH can thereby be potentially filled with a standard filling compound FUM. A soft, pasty compound that is provided with thixotropic agents is preferably used as the filling compound. It can also be potentially expedient to provide a standard cable filling compound FM' in the free space or gores between the optical transmission elements UE1 through UEn stranded with one another. This particularly serves the purpose of rendering the cable core KS longitudinally water-tight.

In order to be able to especially reliably assure the cohesion of the optical transmission elements UE1 through UEn over the length of the stranded cable core KS immediately after the stranding process, for example in order to be able to oppose an unravelling of the stranded union of the cable core KS, a loop union of a plurality of retainer elements is provided on the outside circumference of the cable core KS over the entire length thereof, as for example shown in FIG. 42. The basic principles of the inventive loop formation and loop chaining disclosed by the methods of FIGS. 1–32 for one or two retainer elements can also be advantageously transferred or, respectively, expanded to even more, particularly more than two separate retainer elements.

In the view of FIG. 33, the cable core KS is continuously conveyed forward perpendicular to the plane of the drawing. This haul-off direction perpendicular to the plane of the drawing of FIG. 33 is indicated by a solid black circle AZ in the center of the cable core KS.

In the cross sectional view of FIG. 33, three different loop-laying apparatus FN1 through FN3 are positioned at the same longitudinal location for three discrete or, respectively, separate retainer elements or lapping elements HE1 through HE3, which are arranged at three different circumferential positions along the outside circumference of the traversing cable core KS. The three loop-laying apparatus FN1 through FN3 are thereby respectively arranged fixed in longitudinal location with respect to the traversing cable core. As viewed in the circumferential direction, the loop-laying apparatus FN1 through FN3 are thereby offset relative to one another by the same circumferential angle of 120°. For the sake of clarity in the drawings, the respective loop-laying apparatus are only respectively schematically indicated with their guide needles or elements. A respective gripper element GR1 through GR3 is allocated to the respective guide needle of the loop-laying apparatus FN1 through FN3, namely, in detail, the gripper element GR1 for the guide needle or member FN1, the gripper element GR2 for the guide needle FN2 and the gripper element GR3 for the guide needle FN3. For the sake of clarity in the drawings, the respective gripper element is merely schematically indicated in the form of a hook.

The chaining principle for the three retainer elements HE1 through HE3 is implemented in chronological succession, particularly in the following way:

The retainer element HE1 is hauled off from a supply reel VS1 that is stationary in space and the element is conducted through the guide eyelet OP1 of the guide needle FN1. A loop or, respectively, sling SL1 of the first retainer element HE1 is pulled and held open along a sub-section of the outside circumference of the cable core KS with the assistance of the gripper element GR1. In the cross sectional view of FIG. 33, this sling SL1 is shown turned out by 90° compared to its actual positional plane on the exterior surface of the cable core KS. Viewed spatially, the sling SL1 lies on the exterior surface of the cable core KS and extends thereat in the form of a helical section around about one-third of the outside circumference of the cable core. This helical course of the sling SL1 is formed in that the gripper element GR1 seizes the retainer element HE1 at the circumferential position of the guide need FN1 and changes its circumferential position to the guide needle FN2 in, for example, a counter-clockwise sense while the cable core KS continues to run in the haul-off direction AZ. Since the loop SL1 lies against the exterior surface of the cable core KS, it is entrained in the haul-off direction by a continuously passing cable core KS. Due to the combination of the longitudinal haul-off motion as well as the partial rotational motion around a third of the outside circumference of the cable core KS, the sling or loop SL1 is laid along the sub-section of an imaginary helical line on the circular-cylindrical cable core KS.

The retainer element HE2 that is likewise hauled off from a supply reel VS2 that is stationary in space and is pulled through the guide eyelet OP2 of the second guide needle FN2. The guide needle FN2 is suspended movable back and forth in a radial direction, which is illustrated by the double-arrow BW2. The guide needle FN2 is passed or, respectively, punched through the loop SL1 of the first retainer element HE1 held open by the gripper element GR1, so that the second retainer element HE2 penetrates the imaginary surface enclosed by the opened loop SL1. The retainer element HE2 is passed radially inward with reference to the longitudinal axis of the cable through the open loop SL1 and is grasped with the assistance of the second gripper element GR2. As soon as the gripper element GR2 has seized the retainer element HE2, the gripper element GR1 is released from the loop SL1. However, before the release of the gripper element GR1, as well as the cinching of the loop SL1, the guide needle FN2 is thus moved radially outward out of the loop SL1. The unhooked gripper element GR1 is subsequently moved back to the circumferential location of the guide needle FN1. This reciprocating motion of the gripper element GR1 in the circumferential direction is indicated with the assistance of the double-arrow UR1 in FIG. 33. A loop or, respectively, sling SL2 is thereby drawn from the retainer element HE2 in that the gripper element GR2 changes its circumferential position from the circumferential location of the guide needle FN2 to the circumferential location of the guide needle FN3, which is a counter-clockwise movement. In the view of FIG. 33, the loop SL2 is also shown turned 90° out of its actual attitudinal plane along the outside circumference of the cable core KS. The loop thereby extends along approximately one-third of the outside circumference of the cable core KS. The partial rotational motion of the gripper element GR2 is indicated with the assistance of the double-arrow UR2. The loop SL2 is chained with the first loop SL1 in a circumferential direction in this way. Since the loop SL1 as well as the loop SL2 appended thereto press against the surface of the traversing cable core KS, the loop SL2 is also entrained in the longitudinal direction by the cable core KS and a helical course is thus automatically forced onto the loop SL2. A tensile force acts on the loop SL1 due to the longitudinal haul-off motion so that the loop SL2 is cinched and a non-releasable connection is effected between the loop SL1 and the loop SL2.

The third retainer element HE3 is passed through the guide eyelet OP3 of the guide needle FN3. This retainer element HE3 is likewise continuously unwound from a supply reel VS3 that is stationary in space. Like the two guide needles FN1 and FN2, the guide needle FN3 is suspended fixed in a longitudinal position relative to the traversing cable core KS. It can be moved back and forth in a radial direction indicated by the double-arrow BW3. The guide needle FN3 is moved radially inward through the loop SL2 while the gripper element GR2 holds the loop SL2 open, so that the retainer element HE3 penetrates the opened loop SL2. The retainer element HE3 is seized with the assistance of a gripper element GR3 and a new loop SL3 is pulled through the loop SL2. The gripper element GR3 migrates or moves in the counter-clockwise direction from the circumferential position at the guide needle FN3 to the circumferential position of the guide needle FN1 and thereby continuously pulls the loop SL3 in terms of length while this is being entrained in a longitudinal direction by the traversing cable core KS. The gripper element GR2 is released and moved back into the circumferential position of the guide needle FN2 as soon as the gripper element GR3 has hooked into the loop SL3. As a result thereof, the second loop SL2 is cinched due to the longitudinal haul-off force that takes effect and a chaining of the two loops SL2 and SL3 is effected in a circumferential direction. The reciprocating motion of the gripper element GR2 between the circumferential position of the guide needle FN2 and the circumferential position of the guide needle FN3 is indicated with the assistance of the double-arrow UR3 in FIG. 33. As soon as the gripper element GR3 has seized the loop SL3, the guide needle FN3 is thereby radially outwardly retracted from the opened loop SL2 and the gripper element GR2 is released from the loop SL2 so that the loop SL2 is cinched upon formation of a radial retaining force for the stranded union or cable core KS.

The gripper element GR3 pulls the loop SL3 along from the circumferential position of the guide needle FN3 to the circumferential position of the guide needle FN1. The loop SL3 is thus also shown turned 90° out of its actual attitudinal plane. Since it lies against the exterior surface of the cable core KS, it is entrained in the longitudinal haul-off direction of the cable core KS and is brought into a helical path. The gripper element GR3 holds the loop SL3 open in the circumferential position of the guide needle FN1 so that this can be passed radially inward through the loop SL3 for the formation of a new loop. The retainer element HE1, thus, penetrates the loop SL3 again. The gripper element GR1 embraces the retainer element HE1 and proceeds continuously with the above-disclosed loop formation for a new sling SL1. As soon as the gripper element GR1 has been hooked onto the retainer element HE1, the guide needle FN1 is moved radially outwardly out of the open loop SL3 and the gripper element GR3 is unhooked. The radial reciprocating motion of the guide needle FN1 is indicated by the double-arrow BW1.

Since the three-element loop chain SL1, SL2, SL3 formed in this manner is entrained by the cable core KS in the haul-off direction, the loop SL3 is also cinched upon formation of the radially acting retaining force for the stranded union KS. When cinching the respective loops, such as, for example, SL1, SL2 and SL3, this is drawn taut or, respectively, tensed so that it places itself more tightly against the stranded union KS upon formation of a radial retaining force. When cinched, the respective loop thus migrates radially inward and places itself against the exterior surface of the cable core KS on a smaller limb. The loop chain SL1, SL2, SL3, etc., thereby constricts radially inward and thereby exerts a radially inwardly acting retaining force on the stranded element of the cable core KS. Due to the combination of the longitudinal haul-off motion at the exterior surface of the cable core KS and the simultaneously occurring pulling motion by about one-third of the outside circumference of the cable core KS, the loop SL3 attached to the loop SL2 is also brought into a path that continuously continues the helical course of the two loops SL1 and SL2 connected to one another.

The three loops SL1, SL2 and SL3 chained to one another thus form a 360° wrap around the cable core KS in the form of a helix, i.e., a three-element loop chain SL1/SL2/SL3 revolves along a length of lay or, respectively, lead once around the traversing cable core KS. The inventive loop-laying and chaining disclosed with reference to the loops SL1, SL2 and SL3 is periodically, particularly continuously, implemented over the entire length of the traversing cable core KS so that the cable core KS is held together by such a loop structure over its entire length. The respectively formed loop is thereby preferably allocated to an angular range of about 120°, for example one-third of the outside circumference of the cable core KS.

Expressed in general terms, a respective loop, such as, for example, SL1, is formed from the respective retainer element HE1 at the outside circumference of the stranded product KS and placed thereon at a prescribable longitudinal location. This loop SL1 is held open until it has been penetrated by a newly-formed loop SL2 of another retainer element. While the loop SL1 being held open is held fast, the newly-formed loop SL2 is entrained in the running direction by the stranded product and cinched such that a chaining of the two loops, for example SL1 and SL2, is obtained.

In particular, it can be expedient to take the retainer elements HE1 through HE3 from their supply reels VS1 through VS3 overhead. Since these supply reels are attached fixed in space, centrifugal force and tensile force problems of a type that usually occur given tangential or central retaining helix spinners with supply reels rotating around the longitudinal cable core are eliminated. In particular, the inventive lapping is suitable given cable manufacture in what is referred to as the on-line manufacturing method, i.e., an endless fabrication of electrical and/or optical cables for the message transmission and/or power transmission. The respective loop-laying apparatus is thereby expediently allocated directly to the envisioned stranding point of the stranding apparatus of a cable manufacturing system in order to be able to hold the stranding elements of a stranded product together as a bundle immediately after they leave their stranding apparatus, such as shown in FIG. 42.

The retainer elements HE1 through HE3 preferably run continuously from their supply reels VS1 through VS3 with the same haul-off speed as the forward conveying speed of the cable core KS in the haul-off direction AZ. The loops of the retainer elements HE1 through HE3, namely, are entrained in a longitudinal direction at the outside circumference of the traversing cable core KS, i.e., the loop structure is firmly coupled to the traversing cable core KS.

As warranted, it can also be expedient to apply the loop-Laying apparatus FN1, FN2 and FN3 offset in a longitudinal direction relative to the traversing cable core KS. This can be expedient, particularly given cable cores with very small outside diameters, in order to have adequate space for the respective loop-laying apparatus available at the outside circumference of the cable core KS.

Only three loop-laying apparatus along the outside circumference of the cable core KS were illustrated in FIG. 33. As needed, it can be expedient to arrange and operate only one, two or more than three loop-laying apparatus at the outside circumference of the cable core KS in accordance with the function and action of the three loop-laying apparatus FN1, FN2 and FN3. Given generally n retainer elements, it is expedient to arrange n inventive loop-laying apparatus along the outside circumference of the traversing cable core offset relative to one another in the circumferential direction by about 360°/n.

When, for example, only the loop-laying apparatus FN1 is arranged at the outside circumference of the cable core KS, as shown in FIGS. 1–11, but the two loop-laying apparatus FN2 and FN3 are omitted, then the gripper element GR1 expediently pulls a respective loop of a single retainer element around the entire outside circumference of the traversing cable core KS, for example through 360°, before the guide needle FN1 penetrates the loop formed in this way and a new loop of one and the same retainer element is pulled through the previously-formed loop held open by the gripper element GR1.

Given two loop-laying apparatus for two retainer elements, for example as shown in FIGS. 12–23, around the outside circumference of the cable core KS, it is expedient to arrange these offset by about 180° relative to one another. The respective gripping elements of the respective guide needles then preferably draw a respective loop that proceeds over half of the outside circumference of the cable core KS.

With the assistance of n loop-laying apparatus on the outside circumference of the cable core KS, thus, n loops can, in particular, be distributed over the outside circumference of the traversing cable core KS, i.e., a helix having a length of lay can be formed that is preferably composed of n sub-loops.

Expressed in general terms, thus, a plurality of retainer elements, such as, for example, HE1, HE2, HE3, are continuously formed into loops, such as, for example, SL1, SL2, S13, at different positions on the outside circumference of the stranded product KS, and these loops are chained to one another in a circumferential direction for holding a traversing bundle, particularly a stranded product, such as, for example, KS, of a plurality of electrical and/or optical transmission elements, such as, for example, UE1 through UEn, together with at least one elongated retainer element, such as HE1. In particular, the individual loops are thereby placed at their allocated circumferential positions along the outside circumference of the stranded product KS in chronological succession so that the circumferential location for forming a new loop chaining is respectively varied after the penetration of two loops, such as, for example, SL1 and SL2. The loops, such as, for example, SL1, SL2 and S13, are thus formed in chronological succession along the outside circumference of the stranded product and intertwined with one another.

In this way, it becomes possible to continuously surround the traversing cable core with a loop chain without requiring a rotational motion of the supply reel for the respective lapping or winding element around the longitudinal axis of the stranded product, as in the standard tangential or central retaining helix spinners. On the contrary, the supply reels for the respective retaining elements can be arranged at a stationary location. In particular, overhead haul-off of the respective retainer elements from a stationary supply reel is enabled. Control problems with respect to centrifugal forces and tensile forces are thus avoided from the very outset in a simple, as well as fast, guidance of the retainer element is offered upon application onto the traversing retainer element. Due to the chaining of a plurality of retainer elements, moreover, the loop formation and chaining around the outside circumference of the cable core are simplified and an especially effective cohesion of the stranded elements of the cable core is effected over the entire length thereof.

Figure 34:
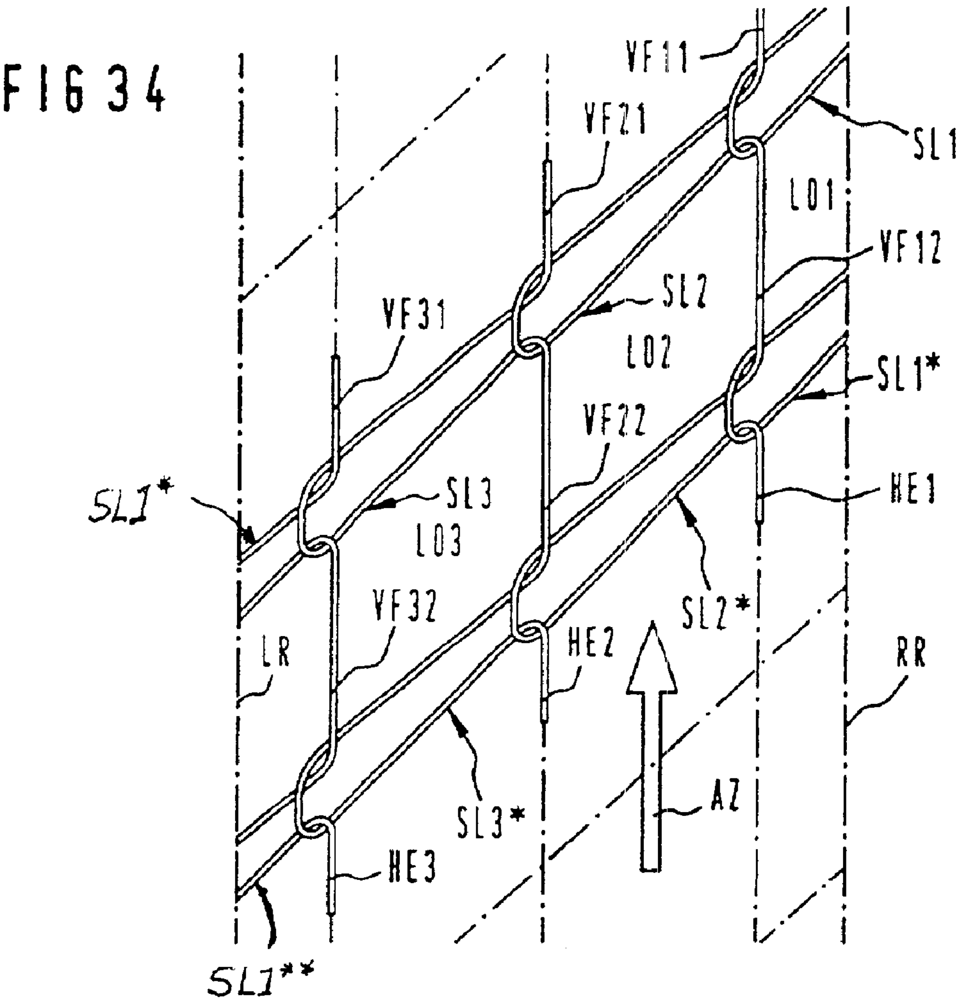
FIG. 34 is a schematic imaginary view of a loop chain formed by the method of FIG. 1 lying in a common developed plane.

The three-element loop structure of FIG. 33 is schematically shown in an unwound condition in a common positional plane in FIG. 34, for example in a way an observer would see the structure given an imaginary 360° revolution in the longitudinal cable direction, The cable chains SL1, SL2 and SL3 of FIG. 33 is cut open in a radial direction at section lines LR and RR and then are removed from the cable core KS and laid out in a column attitudinal plane of FIG. 34. The left section line LR, shown in dot-dashed lines, is on the left edging of the unwound loop structure, while the right section line RR of FIG. 33 is re-encountered dot-dashed and is on the right edging. Thus, the beginning portion of loops, such as SL1, SL1*, SL1, are on the left-hand side, while the final loop portions of SL1 and SL1*** are on the right-hand side of the Figure.

As illustrated, a rhomboidal lapping grid occurs, wherein the loops with their appertaining connecting threads describe rhomboidal openings, such as, for example, LO1, LO2, LO3, between them at which the cable core remains uncovered. In FIG. 34, a respective three-element loop chain, such as, for example, SL1, SL2, SL3, proceeds from the upper right toward the lower left as an oblique straight line. This results therefrom that the loop chain, viewed spatially, surrounds the cable core as a helical line, In addition, a three-loop chain SL1*, SL2*, SL3* that has a fabricated chronologically latter than the sloop Ghain SL1,SL2,SL3 is shown and a beginning of a third chain having a loop SL1** is illustrated.

As illustrated, the loop SL2 has its two free loop ends VF11 and VF12 conducted through the loop SL1 and a chaining between the two loops SL1, SL2 is obtained. Analogous thereto, the loop SL3 has its two free loop ends VF21 and VF22 looped through the sling SL2 and a coupling is obtained. The loop SL3 is, in turn, penetrated by the free connecting ends VF31 and VF32 of the first loop SL1*.

A chaining of the loops transversely or, respectively, obliquely, but not perpendicularly to the haul-off direction AZ, is offered in this way. Viewed in the haul-off direction AZ, a chaining between the three-element loops SL1, SL2, SL3 and the next following three-element loop chain SL1*, SL2*, SL3* is obtained in the following way:

Viewed in the haul-off direction AZ, a longitudinal tying of the loop SL3 to the third loop SL3* of the loop chain SL1*, SL2*, SL3* formed later is obtained via a connecting thread VF32 proceeding longitudinally in the haul-off direction AZ. The connecting thread VF32 thereby penetrates the loop SL3 to form a loop SL1* and then penetrates the loop SL3* to start to form a loop SL1. This will produce a non-releasable connection in the longitudinal direction. The second loop SL2 is lined to the first loop SL1* by a connecting thread VF12 that proceeds in the haul-off direction AZ. The connecting thread VF12 thereby penetrates the loop SL1* and merges into the loop SL2*. The third loop SL3 is, in turn, linked to the third loop SL3* by a connecting thread VF22 which proceeds in the haul-off direction AZ, and the connecting thread VF22 penetrates the second loop SL2 as well as the second loop SL2*. A longitudinal connection between the loop chains that proceed helically when viewed spatially is thus produced in the haul-off direction. The connecting threads VF1, VF21 and VF31 produce the coupling of the loop chains SL1, SL2 and SL3 to correspondingly fashioned loop chains produced chronologically earlier in an analogous way in the haul-off direction. AZ. A chaining of successive loops, such as, for example, SL1, SL1***, in the longitudinal direction of the stranded product KS is thus effected by the connecting threads that proceed axially or along the haul-off direction AZ.

The periodic continuation of this rhomboidal loop network is indicated in FIG. 34 with the assistance of dot-dashed lines. Viewed overall, thus, a chaining of the loops, such as, for example, SL1, SL2, SL3, is effected in a longitudinal direction and/or circumferential direction of the cable core KS.

The loop structures shown in FIGS. 1–34 are particularly suited as a replacement for traditional retaining helices, such as, for example, threads, twines, yarns, etc., for holding stranded products together in cable technology. It can be just as expedient to employ such a structure as a weave replacement or electromagnetic shielding. In particular, metallic wires, threads, twines or other electrically conductive retainer elements are then applied around the cable core. What are referred to as "ply" elements or, respectively, filaments, especially bands, that are formed of a plurality of individual thin wires are particularly suited for the production of a weave replacement. In addition, the inventively applied loop chains can also serve merely for identifying, for example labelling, of the respective cable cores. To that end, it is expedient to color the respective-retainer element with a clearly discernible color.

The cable core KS can have 1% through 100% of its exterior surface covered in this way with a loop structure of the inventive type. In particular, it can thereby suffice to employ retainer elements having an outside diameter of, at most, 5% of the outside diameter of the stranded union for holding the stranded product, particularly a cable core, together.

The inventive application of the loop structure is especially distinguished in that the loop-laying apparatus can be utilized in endless fabrication on-line in cable manufacture. In addition, cable cores that vary greatly in outside diameter can be inventively lapped with at least one retainer element with the loop-laying apparatus disclosed in FIGS. 1–34. The inventive loop production and laying can allow retainer element loops to be applied as "retaining helix replacement", upon formation of a radially-acting retaining force independently of the respective geometry of the stranded product.

A chronological sequence of the loop-laying of a single retainer element, as well as loop chaining, according to FIGS. 1–11 is schematically shown in cross section in FIGS. 35–41 and is viewed in the haul-off direction AZ. The haul-off direction AZ is perpendicular to the plane of the drawings arid is illustrated by the dot in FIGS. 35–41.

Figure 35:
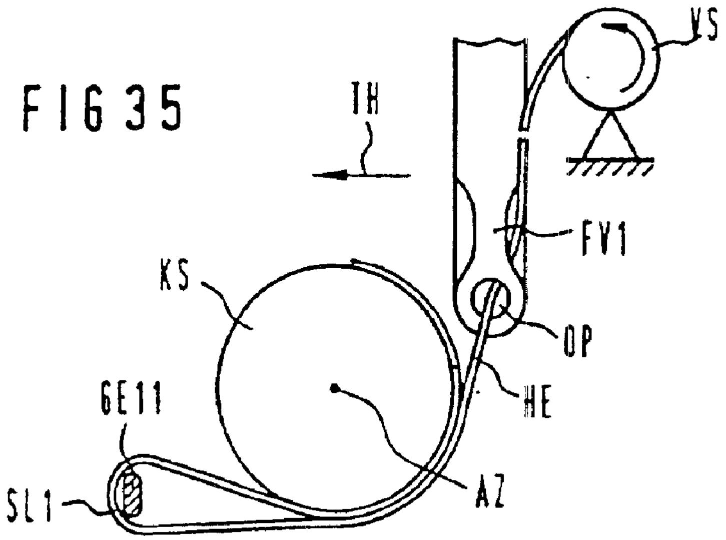
Figure 36:
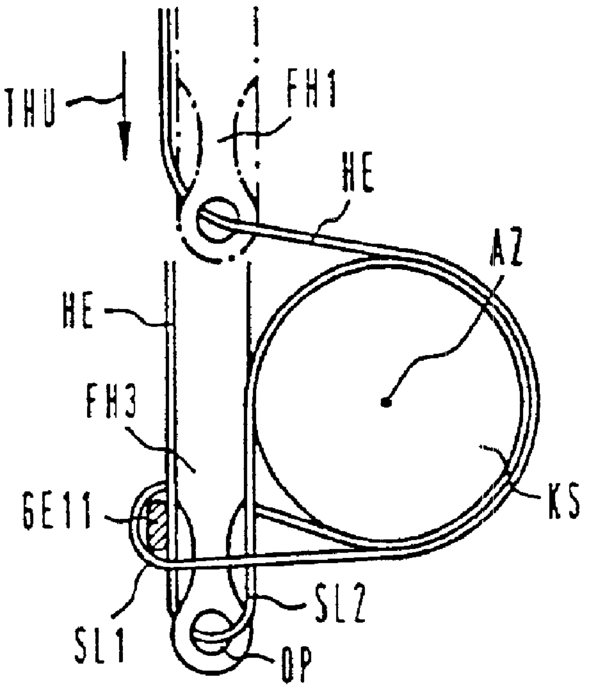
Figure 37:
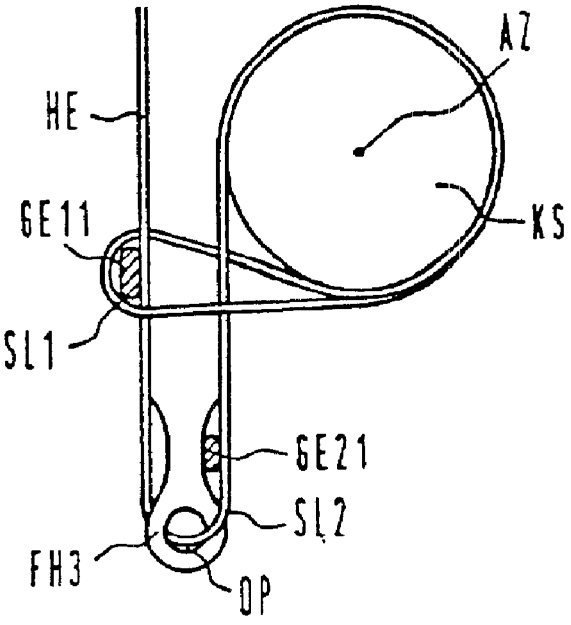

The retaining element HE in FIG. 35 is continuously hauled off from a locally stationary supply reel VS and conducted through a guide eyelet OP of a guide needle or member FV1. In the time illustrated in FIG. 35, the guide needle FV1 is allocated to a first quadrant in an upper right half of the Figure. With the assistance of a gripper element GE11, the retainer element HE in the form of a loop SL1 is conducted around the cable core KS in a circumferential direction along a sub-section of its outside circumference. The gripper element GE11 thereby pulls the loop SL1 onto the left side of the core KS opposite the position of the guide needle FV1 in FIG. 35, which needle FV1 is on the right side and opposite the loop forming chronologically therebefore. In order to achieve a loop chaining, the guide needle FV1 is moved into the left half of the Figure, for example where the loop SL1 is held open by the gripper element GE11. This transaxial movement of the guide needle FV1 from the right to the left half of FIG. 35 is indicated with the assistance of a motion arrow TH. In this new longitudinal position, the guide needle is referenced PH1 and is indicated in dot-dashed lines in FIG. 36. The guide needle is moved downward through the loop SL1 held open by the gripper element GE11. The guide needle is referenced FH3 in this downward position and illustrated in bold lines. In this way, the retainer element HE is pulled through the open loop SL1 in the form of a new loop SL2. This loop SL2 is seized or held fast with the assistance of a gripper element GE21 (see FIG. 37). As soon as the gripper element GE21 has been hooked onto the new loop SL2, the guide needle FH3 is withdrawn from the loop SL1, which is being held open by the gripper element GE11, which is then unhooked from the loop SL1. The upward motion of the guide needle is indicated in FIG. 38 with the assistance of an arrow. THO and the new motion status or position of the guide needle is referenced FH1. The gripper element GE21 is now moved onto the opposite side of the traversing cable core KS, which movement is indicated by the arrow GTV The gripper element GE21 thereby pulls the loop SL2 around the lower half of the outside circumference of the cable core KS onto the opposite side thereof. Due to the simultaneous longitudinal haul-off motion of the cable core KS, the loop SL2 is pulled longitudinally along a path that winds helically around the cable core KS. Together with the loop SL2, the guide needle is simultaneously moved into the right half of the Figure and back to the position FV1 on the first side of the traversing cable core KS, which is the right side illustrated in FIGS. 35–41. This movement is indicated by the arrow TV.

Figure 40:
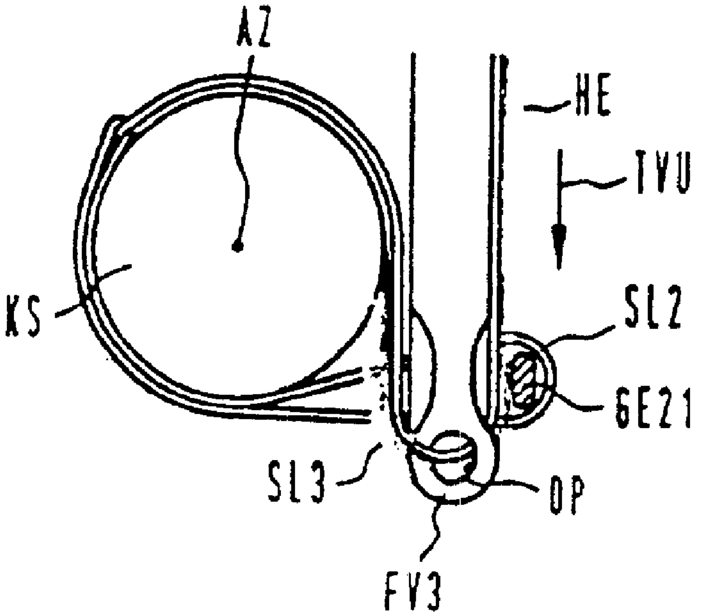

In FIG. 39, the loop SL2 is held open with the assistance of a gripper element GE21 in the right half of the Figure, so that the guide needle can be punched through the open loop SL2 by being moved to the position FV3 (FIG. 40). The guide needle is thus moved downward through the loop SL2 held open by the gripper element 22, and this downward motion is illustrated by the arrow TVU.

Figure 41:
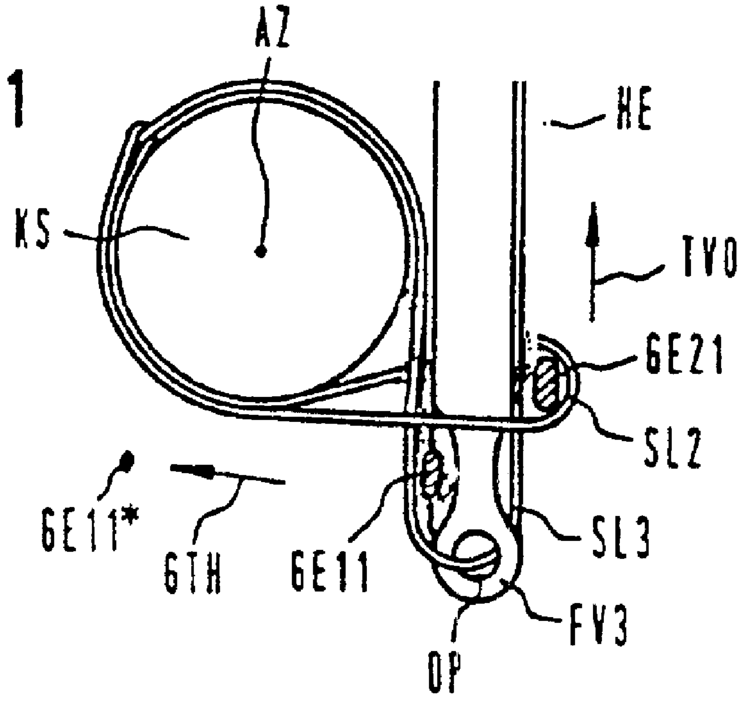

In the instant with the guide needle in the position FV3 and penetrating the loop SL2, as shown in FIG. 41, the gripper element GE11 is moved to a position to seize the retainer element HE penetrating the loop SL2 and pulls a new loop SL3, as shown in FIG. 41. As soon as the gripper element GE11 is hooked into the loop SL3, the guide needle FV3 is again moved upward from the position FV3 out of the loop SL2, which is indicated by the arrow TVO, and the gripper element GE21 is unhooked from the loop SL2. The gripper element GE11 then pulls the loop SL3 down around the cable core onto the left side of the cable core KS to a position GE11* by moving in the direction of an arrow GTH.

What is achieved by this is that the new loop SL3 is pulled through the loop SL2 formed chronologically earlier and the two loops SL2 and SL3 are chained to one another in a circumferential direction. A loop chain that proceeds roughly zig-zag is provided in this way at the under side of the cable core KS passing through in the haul-off direction AZ. An appertaining connecting thread also proceeds zig-zag on the upper sub-half of the cable core passing in the haul-off direction AZ. Viewed in a plan view, this will yield a loop structure as shown in FIG. 31.

Since the loop structure placed onto the bundle is chained in a circumferential direction as well as in a longitudinal direction and is entrained by the bundle in the haul-off direction, the loops cinch upon formation of a radially acting retaining force for the bundle. Given an approximately haul-off speed of the traversing bundle, the respective loop is automatically charged with an approximately constant tensile stress. Complicated control devices for the tensile stress for the respective retainer elements can thus be eliminated from the very outset.

The loop-laying apparatus, such as described in FIGS. 1–41, is particularly useful when incorporated into an endless assembly line for the manufacture of an electrical and/or optical communication cable, such as illustrated in FIG. 42. In the device of FIG. 42, stranding elements VE1 through VEn (only two shown for purposes of illustration), which may be either electrical and/or optical transmission elements, such as, for example, electrical leads or light waveguide leads, are hauled off from their respective supply reels VT1 through VTn. These leads VE1 through VEn are then SZ-stranded with the assistance of an SZ-stranding apparatus, particularly a pipe storage machine SZR. The pipe storage machine SZR comprises an approximately circular-cylindrical storage element SKA which is hollow so that a central reinforcing element can pass therethrough. The storage element SKA is suspended rotatable on Its central axis at both ends with stationary bearings, such as LA1 and LA2. A stranding element delivery disk ZF that is fashioned similar to an apertured disk is seated in the region of the input side end of the storage element SKA. The stranding elements VE1 through VEn are conducted through bores or openings OF1 through OFn of the delivery disk ZF and are distributed circumferentially spaced around the outside circumference of the storage element SKA. A stranding disk VSA is firmly mounted on the discharge end of the storage element SKA. The disk VSA is mounted with the assistance of the bearing LA2, particularly an annular ball bearing, so that the disk VSA may rotate with the storage element SKA. The stranding disk VSA is driven with the assistance of a motor MO which is schematically illustrated and connected thereto by an arrow WP.

For SZ-stranding, the stranding disk VSA is expediently driven such that it changes in rotational sense after a prescribable number of revolutions. The stranding elements VE1 through VEn are thereby helically wound along the storage element SKA and are then pulled through the openings DU1–DUn of the stranding disk VSA and stranded with one another at an imaginary stranding point VP in a stranding nipple VIV that follows the stranding disk VSA. Due to the oscillating rotational movement of the storage element SKA with the stranding disk VSA firmly attached at the end, the SZ-stranding of the stranding elements VE1 through VEn is effected and the cable core KS is formed. For the bringing of the stranding elements VE1 through VEn together, the stranding nipple VIV preferably comprises a converging tapering opening, whose inside diameter preferably corresponds to about the outside diameter of the cable core KS to be produced.

In order to be able to prevent the unravelling of this stranded union, particularly in the region of the reversing locations thereof which periodically reoccur after a length of lay, the stranding nipple VIV is followed by at least one inventive loop-Laying apparatus SLV that works according to the basic principles disclosed in FIGS. 1–41. The cable core KS is surrounded with a loop structure ST in this way that holds the stranded elements together. With the assistance of the haul-off means RA, particularly a caterpillar-type unit, following the loop-laying apparatus SLV, the cable core KS held together in this way is positively grasped and continuously conveyed forward in the direction AZ. Subsequently, an outside cladding AM is applied by a following extruder EX, which extrudes the cladding AM onto the core KS, which has been lapped or wrapped in this manner. The communication cable fabricated in this way is then wound onto a supply drum VT3 driven in a rotating fashion. It can be especially expedient to apply at least one retainer element as directly as possible at the envisioned stranding point VP of the stranding core KS. To that end, the respective loop-laying apparatus SLV can also precede the stranding nipple or be integrated into the stranding nipple VIV itself. This is illustrated in FIG. 42 with the assistance of a retainer element HE* shown in dot-dashed lines.

It can be potentially advantageous to have the respective loop-laying apparatus, such as, for example, SLV, oscillate around the outside circumference of the cable core KS passing through on a straight line in a haul-off direction AZ and to turn it back and forth in a prescribed angular degree. This oscillating rotational movement is illustrated in FIG. 42 with the assistance of a double-arrow PW. It is especially practical given the loop-laying apparatus according to FIG. 33 that comprises connecting elements proceeding longitudinally in a haul-off direction between the individual loops, as illustrated in FIG. 34 with the examples VF12, VF22 and VF32. As a result thereof, these connecting threads are likewise laid on the exterior surface of the bundle KS transversely relative to the haul-off direction AZ. In particular, they assume a meander-like course. As a result thereof, the deterioration of the bending behavior of the finished cable is largely avoided.

In summary, the inventive principle for a longitudinal application and cohesion of an elongated bundle, particularly a stranded product, of electrical and/or optical transmission elements as set forth by way of example with reference to the method of FIGS. 1–42 particularly comprises the following advantages:

A bundle to be wrapped continuously runs through the manufacturing line and, thus, through the loop-laying apparatus integrated therewith so that the haul-off or, respectively, throughput speed for the bundle can be held constant during the application of the retaining element loops.

The loop formation, loop-laying, as well as loop chaining or slinging of the respective retainer element can be endless and, therefore, continuously implemented.

The loop formation of the respective retainer element can thus occur in the region of the envisioned stranding point of the continuously fabricated stranded product in order to keep the electrical and/or optical transmission elements thereof together over the entire throughput length of the cable during an on-line manufacturing method.

The retainer element loops can be applied as "retaining helix replacements" independently of the cross sectional geometry of the traversing bundle upon formation of a retaining force. In particular, bundles that comprise a polygonal, planar-rectangular ribbon structure, trapezoidal, etc., cross sectional shape or, respectively, cable core profile can thus also be inventively held together with the retainer element loops. The "cinching" of the loops of the respective retainer element around the elongated bundle thereby occurs automatically in an especially advantageous way, since the loop structure is entrained in a haul-off direction by the bundle.

A tensile force for the respective retainer element is, thus, automatically set, for example set by itself due to the entrainment by the bundle. As a result thereof, additional and separately provided complicated control mechanisms for controlling the tensile stress can be eliminated. In particular, an essentially constant tensile force in the respective retainer element on the bundle is automatically set when a constant haul-off speed of the bundle occurs.

The loop-laying mechanism itself, therefore, need not comprise any conveyor means for forward conveying of the retainer element loops and/or bundle.

The operating speed of the respective loop-laying apparatus thereby preferably has a fixed relationship to the throughput speed of the bundle and is, thus, synchronized therewith.

The loops chained with one another form a non-releasable, continuous seam around the bundle to be lapped without thereby puncturing it.

The inventive application of one or more retainer elements can, in particular, be implemented, even given haul-off speeds of more than 50 m/min for the bundle.

Due to the feed motion of the bundle in combination with the loop-laying in a circumferential direction of the bundle, essentially obliquely, particularly helically proceeding loops or, respectively, loop structures occur with respect to the longitudinal bundle axis. As a result thereof, an essentially identical bending capability of the bundle in all directions transversely relative to the central bundle axis is assured after application of the retainer element or elements. The loops proceeding in the haul-of direction or structures perpendicular to the haul-off direction AZ, for example at an angle of 90°, are thereby largely avoided.

After the application of the loop structure, the bundle, in particular, is a component part of this structure.

Figure 43:
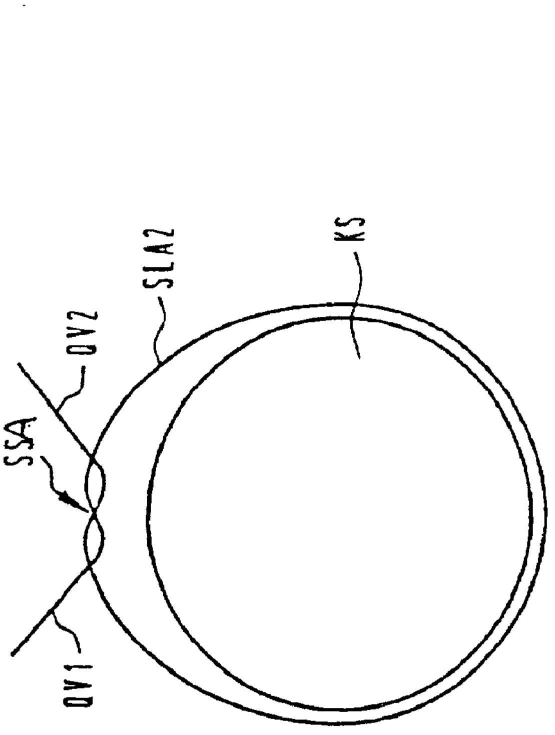
FIG. 43 is a schematic cross sectional view of a cable core having a further inventive loop chain of a retaining element in accordance with the present invention.
Figure 44:
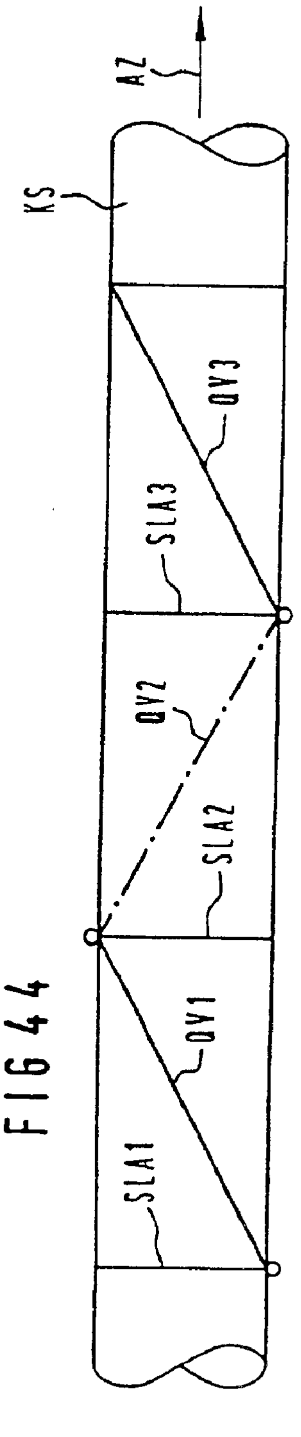
FIG. 44 is a schematic plan view of a cable core of FIG. 43.

As warranted, single loops that are not chained to one another in a longitudinal direction can be placed around the traversing bundle in conformity with the inventive "single-thread" principle. As illustrated schematically in FIG. 43, a retainer element is placed around the cable core KS therein as a single loop SLA2 and a knot SSA in the fashion of a "strap leg" by a double crossover of its loop ends QV1, QV2 in the form of a "prone eight", as a result whereof a loop SLA2 locally constricts the outside circumference of the bundle upon formation of a retaining force. Such individual loops can be continuously applied at prescribed length intervals onto the cable core KS passing through in the haul-off direction. As illustrated in FIG. 44, individual loops SLA1, SLA2, SLA3, etc., analogous to the individual loop SLA2 of FIG. 43, are applied onto the bundle KS, preferably at equidistant length intervals. These individual loops form rings around the bundle, wherein the central bundle axis resides perpendicular relative to the enclosed loop area. Two respective neighboring individual loops do not intermingle and are not looped to one another, but are merely connected to one another via the continuous connecting threads, such as, for example, QV1, QV2, QV3, due to the continuous loop-laying process. These connecting threads wind helically around the elongated bundle KS. Since these connecting threads exert merely no radially acting retaining force on the bundle, they can also be entirely omitted as warranted.

Although various minor modifications may be suggested by those versed in the art, it should be understood that we wish to embody within the scope of the patent granted hereon all such modifications as reasonably and properly come within the scope of our contribution to the art.

We claim:

1. A communication cable comprising an elongated cable core having a tensile strength element (ZE) and a plurality of optical transmission elements (UE1,UEn) stranded around said tensile strength element (ZE) and being held together as a bundle by at least one retainer element, said retainer element being arranged in a form of an interlocking stitch, wherein said interlocking stitch is arranged in a form of loops of a yarn at successive discrete locations, said loops applying a radially acting retainer force to the transmission elements (UE1, UEn).

2. The communication cable according to claim 1, wherein each of said plurality of said transmission elements (UE1,UEn) comprises a tube (KH) and at least one optical light waveguide (LW) within said tube.

3. The communication cable according to claim 2, wherein said tube being further filled with a filling compound (FUM).

4. The communication cable according to claim 3, wherein said filling compound is a thixotropic mass.

5. The communication cable according to claim 1, wherein said arrangement of transmission elements (UE1, UEn) has an annular outside contour (KR).

6. The communication cable according to claim 5 further comprising a cable filling compound (FM) arranged in free space between said transmission elements (UE1,UEn).

7. The communication cable according to claim 1, wherein the loops are formed by a plurality of retainer elements at different positions on an outside circumference of the cable core, wherein these loops are chained to one another.

8. The communication cable according to claim 7, wherein the loops of the retainer elements are provided on an outside surface of the cable core at discrete locations that follow one another in a circumferential direction, and wherein the respective loops are tightened to pinch one another and to provide a radially acting retainer force.

9. The communication cable according to claim 7, wherein the loops are chained to one another in a longitudinal direction and in a circumferential direction to form a substantially helical path around the bundle.

10. A communication cable comprising a plurality of optical transmission elements and at least one retainer element arranged in a form of an interlocking stitch for holding said optical transmission elements together, each of said plurality of transmission element comprising a tube and at least one optical light waveguide within said tube, and said retainer extending about said optical transmission elements without contacting said optical light waveguides of said optical transmission elements, wherein said interlocking stitch is arranged in a form of loops of a yarn at successive discrete locations, said loops applying radially acting retainer force to the transmission elements (UE1, UEn).

11. The communication cable according to claim 10, wherein said arrangement of transmission elements (UE1, UEn) has an annular outside contour (KR).

12. A communication cable comprising a tensile strength element (ZE) and a plurality of optical transmission elements (UE1,UEn) stranded around said tensile strength element (ZE) and at least one retainer element, said retainer element being arranged as an interlocking stitch in a form of loops at successive discrete locations, said loops applying a radially acting retainer force to the transmission elements (UE1,UEn), and each of said plurality of said transmission elements (UE1,UEn) comprising a tube (KH) and at least one optical waveguide (LW) within said tube.

13. The communication cable according to claim 12, wherein said tube being further filled with a filling compound (FUM).

14. The communication cable according to claim 12, wherein said retainer element is a yarn.

15. A communication cable comprising a plurality of optical transmission elements and at least first and second retainer elements for holding said optical transmission elements together, each of said retainer elements forming a sequence of loops, each loop having a closed end and an open end, said open end being formed of first and second portions of the respective retainer element, the first and second portions of the first retainer element of each of its loops penetrating the closed end of the loops of the second retainer element.

* * * * *